(12) United States Patent
Kamiyama et al.

(10) Patent No.: US 12,334,512 B2
(45) Date of Patent: Jun. 17, 2025

(54) SECONDARY BATTERY AND METHOD FOR MANUFACTURING SECONDARY BATTERY

(71) Applicant: Prime Planet Energy & Solutions, Inc., Tokyo (JP)

(72) Inventors: Yuma Kamiyama, Osaka (JP); Daisuke Nishide, Kobe (JP); Yukihiro Mizonobe, Himeji (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 401 days.

(21) Appl. No.: 17/673,799

(22) Filed: Feb. 17, 2022

(65) Prior Publication Data

US 2022/0271347 A1 Aug. 25, 2022

(30) Foreign Application Priority Data

Feb. 19, 2021 (JP) ................... 2021-025171

(51) Int. Cl.
*H01M 10/0587* (2010.01)
*H01M 10/04* (2006.01)
(Continued)

(52) U.S. Cl.
CPC .... *H01M 10/0587* (2013.01); *H01M 10/0431* (2013.01); *H01M 10/058* (2013.01); *H01M 50/471* (2021.01); *H01M 50/474* (2021.01)

(58) Field of Classification Search
CPC ......... H01M 10/0587; H01M 10/0431; H01M 10/058; H01M 50/471; H01M 50/474
(Continued)

(56) References Cited

U.S. PATENT DOCUMENTS 9,293,785 B2 3/2016 Ueki et al.
2011/0318621 A1* 12/2011 Mineya ............ H01M 10/0587
429/94
(Continued)

FOREIGN PATENT DOCUMENTS

CN 102318128 A 1/2012
CN 104766992 A 7/2015
(Continued)

OTHER PUBLICATIONS

English language machine translation of "Battery" By Saito Katsushi in JP2016-091859(A) (Year: 2016).*

*Primary Examiner* — Jonathan G Jelsma
*Assistant Examiner* — Omar M Kekia
(74) *Attorney, Agent, or Firm* — HAUPTMAN HAM, LLP

(57) ABSTRACT

According to the present disclosure, a secondary battery capable of inhibiting precipitation of metallic lithium is provided. A secondary battery disclosed herein includes a wound electrode body, and a battery case. An insufficiently stacked region is formed in the vicinity of a positive electrode starting end portion in a flat portion of the electrode body. In the insufficiently stacked region, the total number of layers of a positive electrode plate and a negative electrode plate is smaller than in other regions in the flat portion. In addition, in the secondary battery, a protruding portion protruding toward at least a part of the insufficiently stacked region is formed on an inner surface of the battery case. As a result, it is possible to prevent pressing failure in the insufficiently stacked region and inhibit precipitation of metal Li due to a local increase in an inter-electrode distance.

10 Claims, 13 Drawing Sheets

(51) Int. Cl.
　　　*H01M 10/058*　　　(2010.01)
　　　*H01M 50/471*　　　(2021.01)
　　　*H01M 50/474*　　　(2021.01)

(58) Field of Classification Search
　　　USPC ........................................................ 429/163
　　　See application file for complete search history.

(56) References Cited

U.S. PATENT DOCUMENTS

| | | |
|---|---|---|
| 2013/0011708 A1 | 1/2013 | Ueki et al. |
| 2015/0162645 A1 | 6/2015 | Kobayashi et al. |
| 2015/0194705 A1* | 7/2015 | Ueno ................ H01M 10/0431 |
| | | 429/94 |
| 2016/0254569 A1 | 9/2016 | Yagi et al. |
| 2017/0125778 A1* | 5/2017 | Iwasa .................. H01M 50/533 |
| 2018/0323475 A1* | 11/2018 | Pasma ................. H01M 50/171 |
| 2019/0252731 A1 | 8/2019 | Yamane |
| 2020/0112047 A1 | 4/2020 | Kanada |
| 2021/0202924 A1* | 7/2021 | Masuda ............ H01M 10/0587 |

FOREIGN PATENT DOCUMENTS

| | | | |
|---|---|---|---|
| CN | 110582866 A | 12/2019 | |
| JP | 2014216128 A | 11/2014 | |
| JP | 2015204236 A | 11/2015 | |
| JP | 2016-091859 * | 5/2016 | ............ H01M 10/04 |
| JP | 2016-105415 A | 6/2016 | |
| JP | 2019169353 A | 10/2019 | |
| WO | 2015075766 A1 | 5/2015 | |
| WO | 2018/204095 A1 | 11/2018 | |

* cited by examiner

SECONDARY BATTERY AND METHOD FOR MANUFACTURING SECONDARY BATTERY

CROSS REFERENCE TO RELATED APPLICATIONS

Priority is claimed on Japanese Patent Application No. 2021-25171, filed Feb. 19, 2021, the content of which is incorporated herein by reference.

BACKGROUND

1. Technical Field

The present disclosure relates to a secondary battery and a method for manufacturing a secondary battery.

2. Description of the Related Art

A secondary battery such as a lithium ion secondary battery has an electrode body including a pair of electrode plates (a positive electrode plate and a negative electrode plate). As an example of these electrode bodies, a wound electrode body in which elongated band-shaped positive and negative electrode plates are wound with a separator interposed therebetween can be exemplified. In such a wound electrode body, one end portions (starting end portions) of each electrode plate are disposed on an inner side of the electrode body, and the other end portions (terminating end portions) are disposed on an outer side of the electrode body. Further, an outer shape of this type of wound electrode body may be formed into a flat shape. The flat-shaped wound electrode body has a pair of curved portions each having a curved outer surface and a flat portion having a flat outer surface connecting the pair of curved portions.

JP2019-169353 discloses an example of a secondary battery including the flat-shaped wound electrode body. In the secondary battery described in JP2019-169353, a winding inner end (a positive electrode starting end portion) of a positive electrode and a winding inner end (a negative electrode starting end portion) of a negative electrode are disposed on an inner side of a flat portion of the wound electrode body. In addition, the winding inner end of the negative electrode has an extension portion extending toward the curved portion side from the winding inner end of the positive electrode, and the extension portion of the negative electrode is folded back within a range in which it does not overlap the positive electrode. According to the secondary battery described in JP2019-169353, since a variation in thickness of the flat portion of the electrode body is inhibited, the electrode body can be easily housed in a battery case. Further, since a variation in distance between the positive electrode and the negative electrode (inter-electrode distance) can also be inhibited, it also has the effect of inhibiting precipitation of metallic lithium (metal Li) due to bias of a charge and discharge reaction.

SUMMARY

Incidentally, in recent years, there has been an increasing demand for durability and a long life span of a secondary battery, and there is a demand for a technique capable of inhibiting the precipitation of metallic lithium more appropriately than before. The present disclosure has been made in view of such demands, and an object thereof is to provide a technique capable of appropriately inhibiting precipitation of metallic lithium.

In order to achieve the object, the technique disclosed herein provides a secondary battery having the following configuration.

A secondary battery disclosed herein includes a flat wound electrode body in which a positive electrode plate and a negative electrode plate are wound with a separator interposed therebetween, and a battery case that houses the wound electrode body. The wound electrode body of the secondary battery includes a pair of curved portions each having a curved outer surface and a flat portion having a flat outer surface connecting the pair of curved portions. Further, one end portion of the positive electrode plate in a longitudinal direction thereof is disposed as a positive electrode starting end portion on an inner side of the wound electrode body, the other end portion thereof is disposed as a positive electrode terminating end portion on an outer side of the wound electrode body, one end portion of the negative electrode plate in the longitudinal direction is disposed as a negative electrode starting end portion on the inner side of the wound electrode body, and the other end portion thereof is disposed as a negative electrode terminating end portion on the outer side of the wound electrode body. Also, the positive electrode starting end portion is disposed inside the flat portion, and the negative electrode starting end portion extends to come closer to one of the pair of curved portions than the positive electrode starting end portion. Further, an insufficiently stacked region in which the number of layers of the positive electrode plate and the negative electrode plate in a thickness direction of the wound electrode body is smaller than in other regions in the flat portion is formed in the vicinity of the positive electrode starting end portion in the flat portion. In addition, in the secondary battery disclosed herein, a protruding portion protruding toward at least a part of the insufficiently stacked region is formed on an inner surface of the battery case, or a spacer is disposed between at least a part of the insufficiently stacked region and the battery case.

The secondary battery of this type is usually used in a state in which the flat portion of the wound electrode body is pressed from the outside of the battery case to reduce a distance (inter-electrode distance) between the positive electrode plate and the negative electrode plate inside the electrode body. However, in the flat-shaped wound electrode body, the insufficiently stacked region in which the total number of layers of the electrode plates (the positive electrode plate and the negative electrode plate) is smaller and a thickness thereof is thinner than in other regions of the flat portion may be generated in the vicinity of the positive electrode starting end portion disposed in the flat portion. In this case, an appropriate pressure is not applied to the insufficiently stacked region, and a local increase in the inter-electrode distance occurs, so that the precipitation of the metal Li can be promoted. On the other hand, the secondary battery disclosed herein is provided with a protruding portion (or a spacer) that intensively presses at least a part of the insufficiently stacked region. As a result, it is possible to prevent a pressing failure in the insufficiently stacked region and inhibit precipitation of metal Li due to a local increase in the inter-electrode distance.

In one aspect of the secondary battery disclosed herein, the insufficiently stacked region is formed between the positive electrode starting end portion and the negative electrode starting end portion along the flat portion. According to the technique disclosed herein, the precipitation of metal Li in the vicinity of the insufficiently stacked region can be appropriately inhibited.

In one aspect of the secondary battery disclosed herein, the protruding portion or the spacer extends along a winding axis of the wound electrode body. This prevents the pressing failure in the insufficiently stacked region more appropriately and Li precipitation resistance can be further improved.

In one aspect of the secondary battery disclosed herein, a length of the insufficiently stacked region along the flat portion is 5 mm or less. By producing the wound electrode body such that the insufficiently stacked region is narrowed, the Li precipitation resistance can be further improved. In addition, the protruding portion or the spacer along the flat portion preferably has a dimension corresponding to the length of the insufficiently stacked region. That is, in the aspect in which the length of the insufficiently stacked region is 5 mm or less, a dimension of the protruding portion or the spacer is preferably 5 mm or less.

In one aspect of the secondary battery disclosed herein, a protruding dimension of the protruding portion from the inner surface of the battery case or a thickness of the spacer is 0.04 mm or more. This appropriately prevents the pressing failure in the insufficiently stacked region appropriately, and the Li precipitation resistance can be more improved.

In one aspect of the secondary battery disclosed herein, a plurality of wound electrode bodies are housed in the battery case. According to the technique disclosed herein, the precipitation of metal Li can be appropriately inhibited even in the secondary battery having such a plurality of wound electrode bodies.

Also, in the aspect using the plurality of wound electrode bodies, an intermediate spacer is preferably disposed between insufficiently stacked regions of two wound electrode bodies disposed adjacent to each other. As a result, the insufficiently stacked regions of each of the plurality of wound electrode bodies can be appropriately pressed, and the Li precipitation resistance can be further improved.

In one aspect of the secondary battery disclosed herein, a recessed portion corresponding to the protruding portion is formed on an outer surface of the battery case. In other words, the protruding portion is preferably formed by pressing and deforming the battery case from the outer surface side using press working. As a result, a positional displacement between the insufficiently stacked region and the protruding portion in a manufacturing process is inhibited, and the effect of inhibiting Li precipitation due to the protruding portion can be appropriately exhibited. Further, since the wound electrode body can be easily housed inside the battery case, it can contribute to improvement of manufacturing efficiency.

In one aspect of the secondary battery disclosed herein, the spacer is an adhesive tape attached to an outer surface of the flat portion of the wound electrode body. As a result, a positional displacement between the insufficiently stacked region and the spacer can be reliably prevented, and the effect of inhibiting the Li precipitation due to the spacer can be appropriately exhibited.

In one aspect of the secondary battery disclosed herein, the wound electrode body is housed inside the battery case in a state in which it is covered with an electrode body holder made of an insulating resin sheet, and the spacer is a protrusion formed on the electrode body holder. Also, in such an aspect, it is possible to prevent the pressing failure in the insufficiently stacked region and inhibit the precipitation of metal Li.

Further, as another aspect of the technique disclosed herein, a method for manufacturing a secondary battery is provided. Such a manufacturing method is a method for manufacturing a secondary battery in which a wound electrode body is housed inside a battery case, including: a winding step of producing a tubular wound body in which a positive electrode plate and a negative electrode plate are wound with a separator interposed therebetween; a molding step of performing press-molding of the tubular wound body to produce a flat-shaped wound electrode body; and a housing step of housing the flat-shaped wound electrode body inside the battery case. In addition, the flat wound electrode body includes a pair of curved portions each having a curved outer surface and a flat portion having a flat outer surface connecting the pair of curved portions, one end portion of the positive electrode plate in a longitudinal direction thereof is disposed as a positive electrode starting end portion on an inner side of the wound electrode body, the other end portion thereof is disposed as a positive electrode terminating end portion on an outer side of the wound electrode body, one end portion of the negative electrode plate in the longitudinal direction is disposed as a negative electrode starting end portion on an inner side of the wound electrode body, and the other end portion thereof is disposed as a negative electrode terminating end portion on an outer side of the wound electrode body. Also, the positive electrode starting end portion is disposed inside the flat portion, the negative electrode starting end portion extends to come closer to one of the pair of curved portions than the positive electrode starting end portion, and an insufficiently stacked region in which the total number of layers of the positive electrode plate and the negative electrode plate in a thickness direction of the wound electrode body is smaller than in other regions in the flat portion is formed in the vicinity of the positive electrode starting end portion in the flat portion. In addition, in the secondary battery disclosed herein, after the housing step, a pressing step of pressing the insufficiently stacked region of the wound electrode body housed in the battery case from the outside of the battery case to deform the battery case, thereby forming a protruding portion protruding toward the insufficiently stacked region, is performed.

According to the manufacturing method having the above configuration, it is possible to easily form the protruding portion that locally presses the insufficiently stacked region to inhibit the precipitation of metal Li. Further, by forming the protruding portion in the pressing step after the housing step, it is possible to prevent occurrence of the positional displacement between the insufficiently stacked region and the protruding portion when the wound electrode body is housed in the battery case, and thus the Li precipitation resistance can be further improved. In addition, since the wound electrode body can be easily housed inside the battery case, it can contribute to the improvement of manufacturing efficiency.

DETAILED DESCRIPTION

Embodiments of the technique disclosed herein will be described below with reference to the drawings. Further, matters other than those specifically mentioned in the present specification and necessary for implementing the technique disclosed herein (for example, a detailed material of each member) may be understood as design matters by those skilled in the art based on conventional techniques in the art. The technique disclosed herein can be implemented on the basis of the content disclosed in the present specification and common technical knowledge in the art. Also, in the present specification, the notation "A to B" indicating a range includes meanings of "A or more and B or less" as well as "preferably larger than A" and "preferably smaller than B".

In addition, in the present specification, "secondary battery" indicates a power storage device in which a charge and discharge reaction occurs when charge carriers moves between a pair of electrodes (a positive electrode and a negative electrode) via an electrolyte. The technique disclosed herein may be applied to secondary batteries (typically lithium ion secondary batteries). In secondary batteries, lithium ions (Li+) are used as charge carriers, and the charge carriers may be precipitated as metallic lithium (metal Li) as a result of a charge and discharge reaction.

Also, reference sign X in each figure referred to in the present specification indicates a "depth direction", reference sign Y indicates a "width direction", and reference sign Z indicates a "height direction". Further, reference sign F in the depth direction X indicates "forward" and reference sign Rr indicates "rearward". Reference sign L in the width direction Y indicates "left" and reference sign R indicates "right". In addition, reference sign U in the height direction Z indicates "upward" and reference sign D indicates "downward". However, these directions are defined for convenience of explanation, and are not intended to limit an installation form when the secondary battery disclosed herein is used.

First Embodiment

1. Configuration of Secondary Battery

Figure 1:
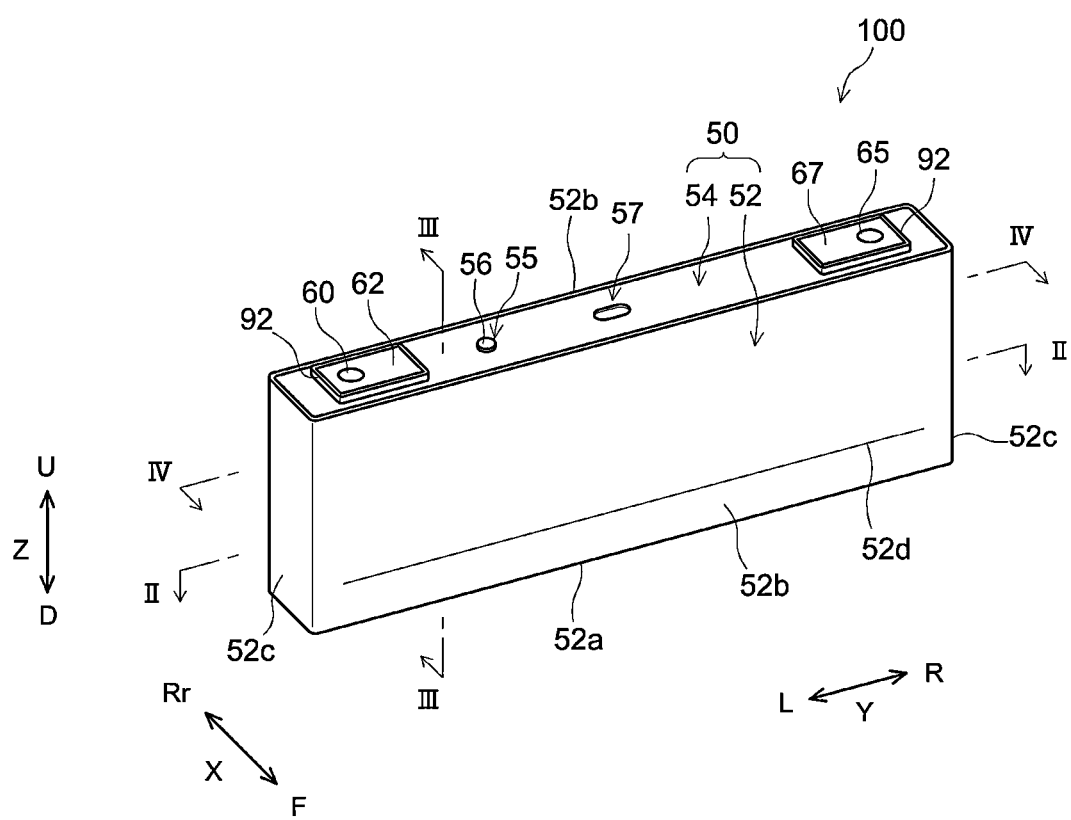
FIG. 1 is a perspective view schematically showing a secondary battery according to a first embodiment.
Figure 2:
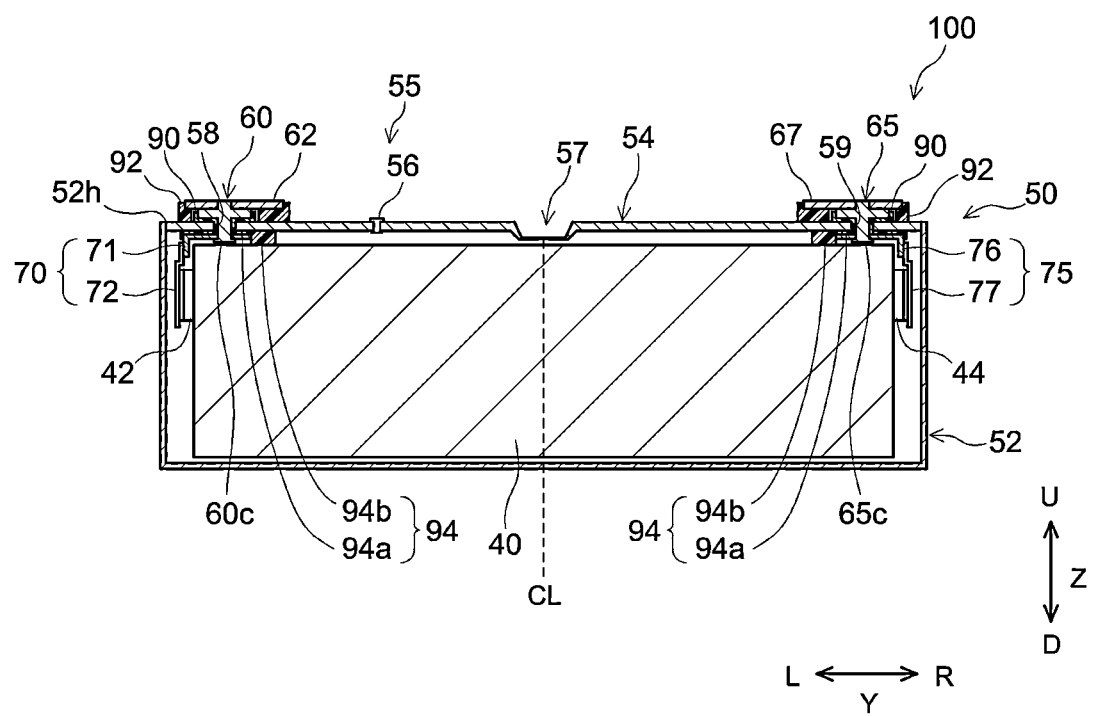
FIG. 2 is a schematic vertical cross-sectional view along line II-II in FIG. 1.
Figure 3:
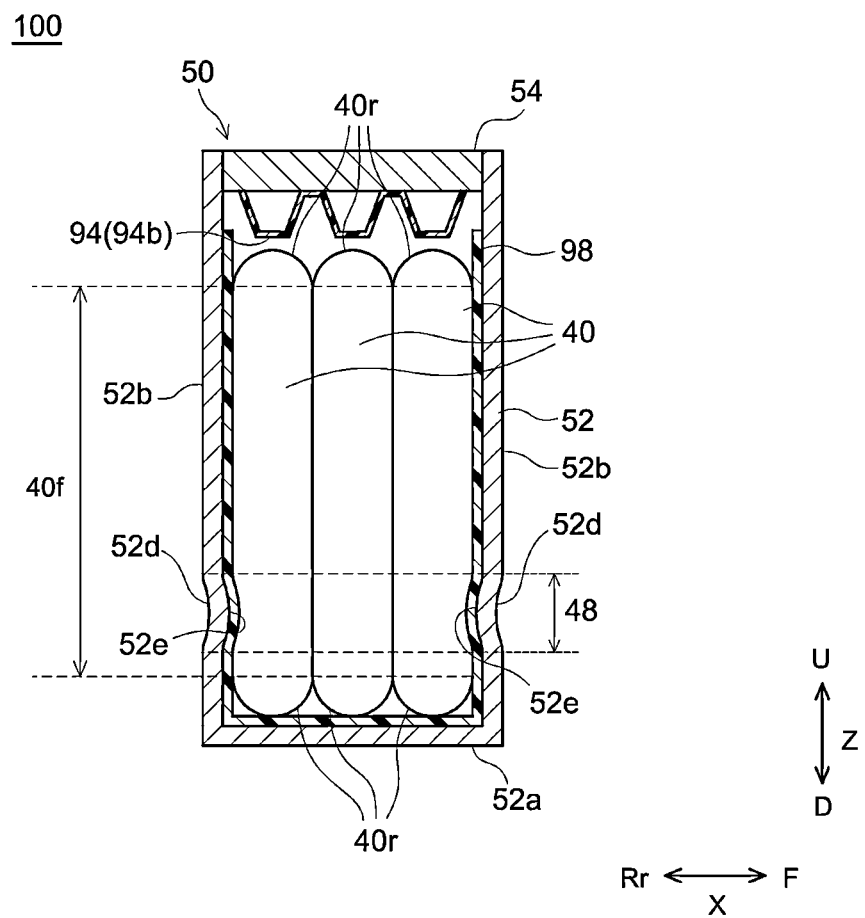
FIG. 3 is a schematic vertical cross-sectional view along line in FIG. 1.
Figure 4:
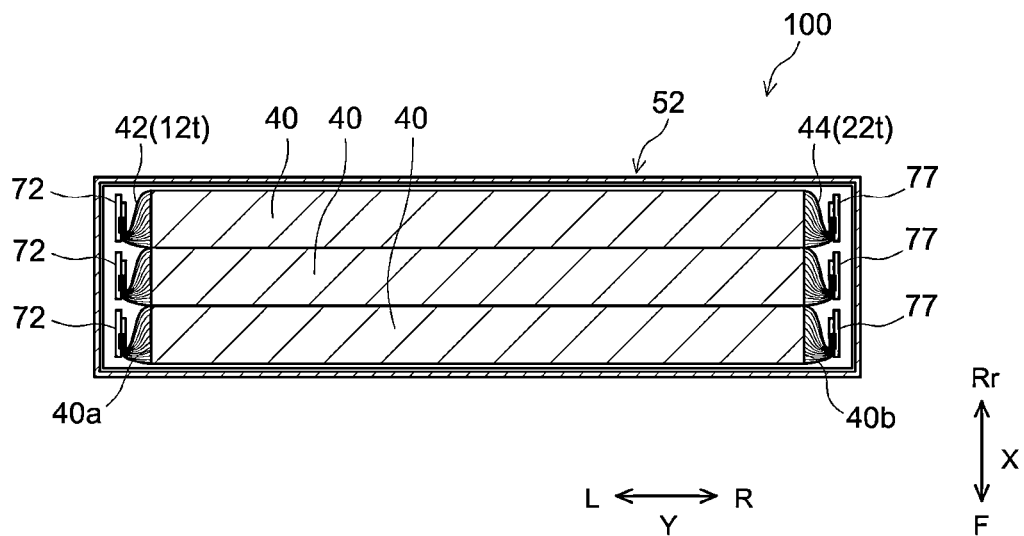
FIG. 4 is a schematic cross-sectional view along line IV-IV in FIG. 1.
Figure 5:
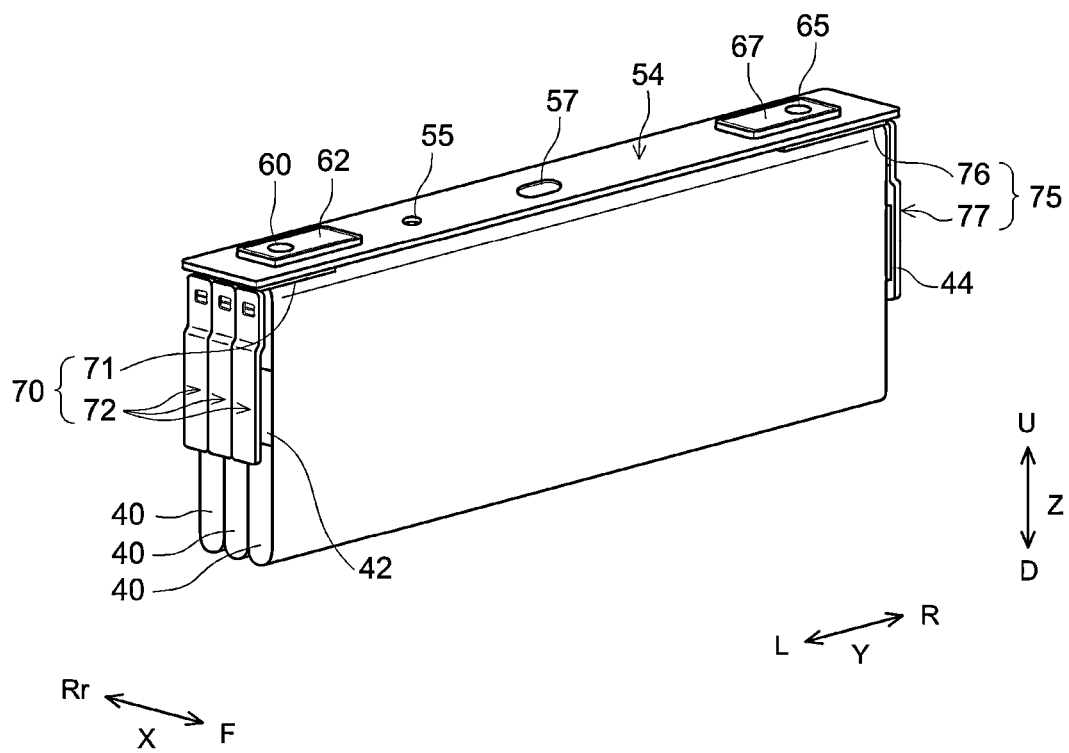
FIG. 5 is a perspective view schematically showing an electrode body attached to a sealing plate.
Figure 6:
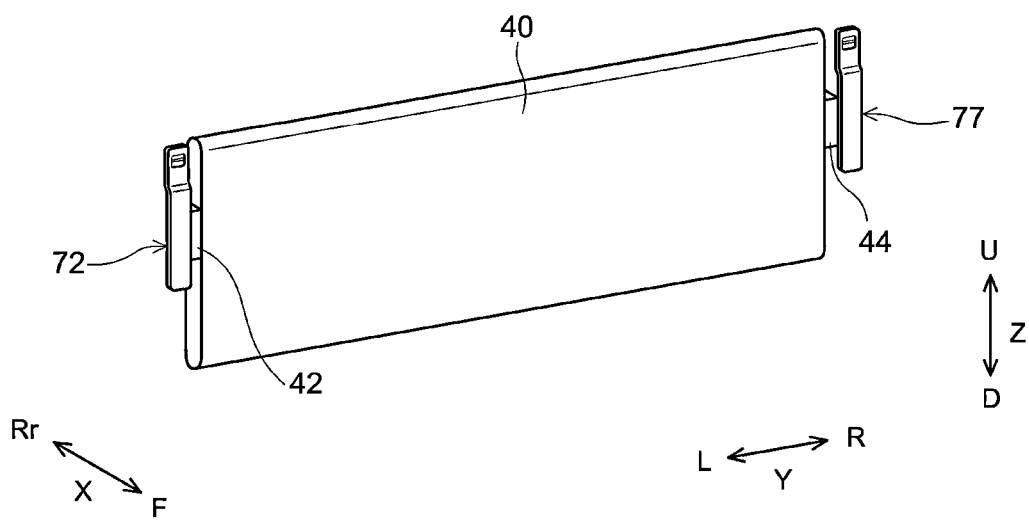
FIG. 6 is a perspective view schematically showing an electrode body to which a positive electrode second current collecting unit and a negative electrode second current collecting unit are attached.
Figure 7:
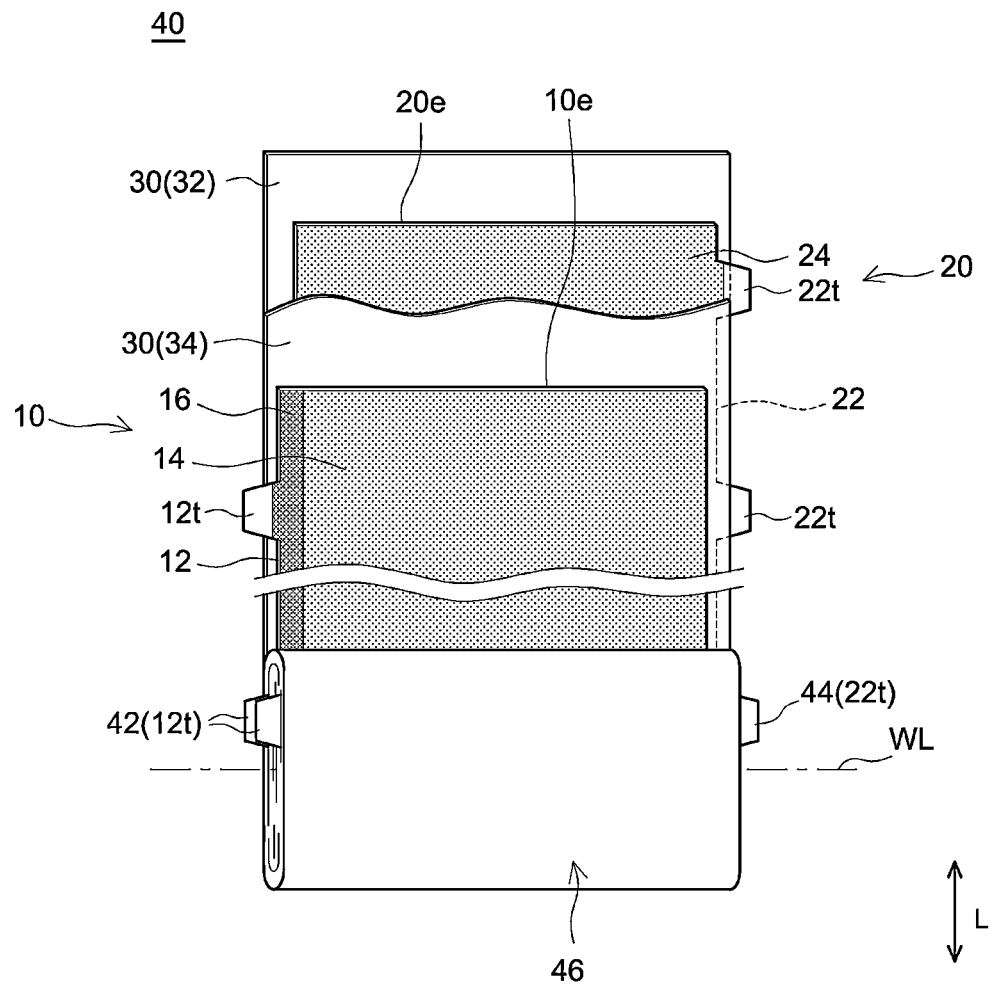
FIG. 7 is a schematic view showing a configuration of a wound electrode body of the secondary battery according to the first embodiment.
Figure 8:
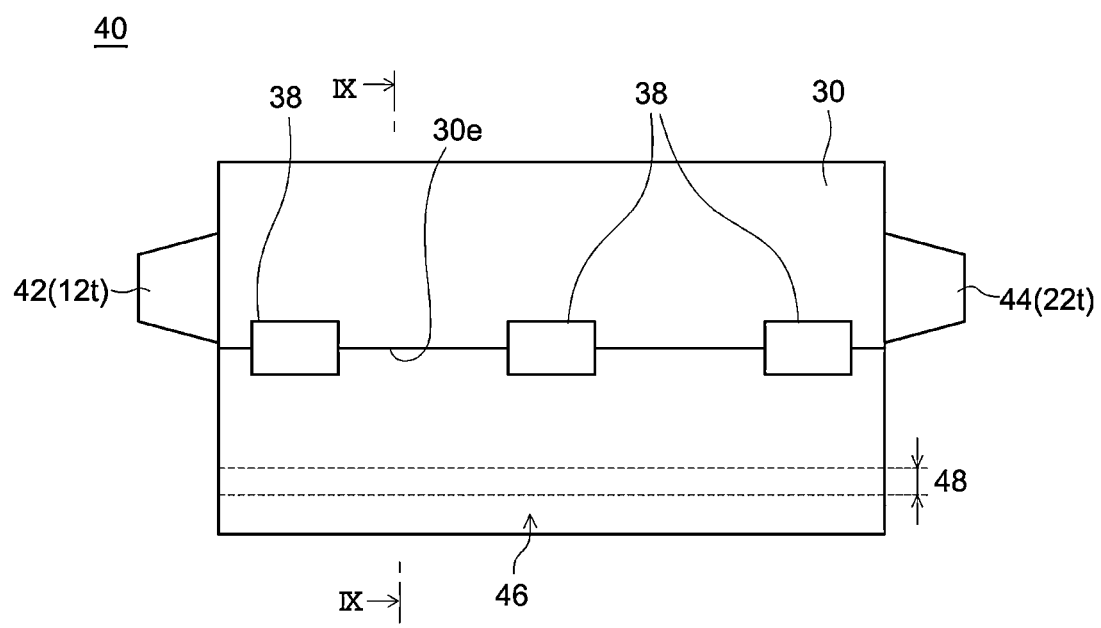
FIG. 8 is a front view schematically showing the wound electrode body of FIG. 7.
Figure 9:
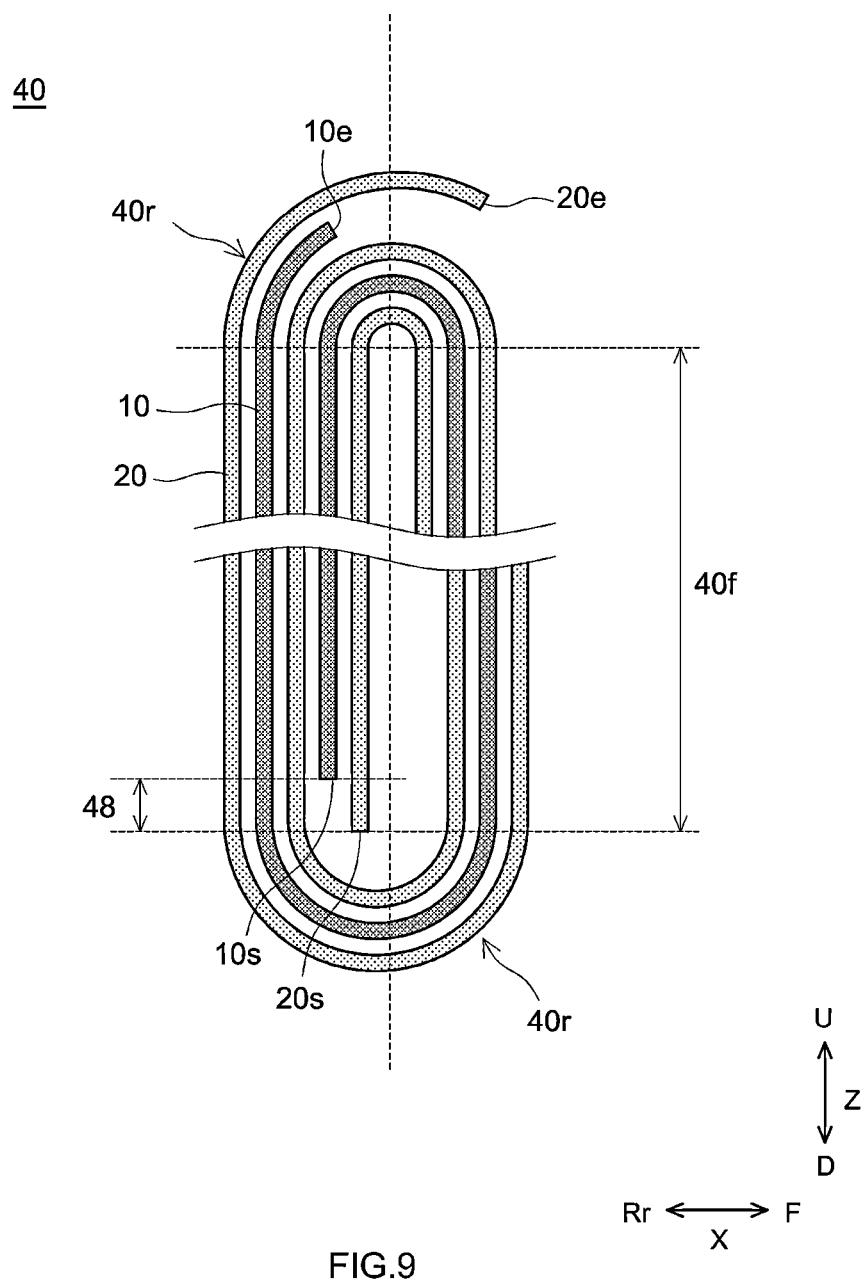
FIG. 9 is a schematic vertical cross-sectional view along line IX-IX in FIG. 8.

One embodiment of a secondary battery disclosed herein will be described below with reference to FIGS. 1 to 9. FIG. 1 is a perspective view schematically showing the secondary battery according to the present embodiment. FIG. 2 is a schematic vertical cross-sectional view along line II-II in FIG. 1. FIG. 3 is a schematic vertical cross-sectional view along line in FIG. 1. FIG. 4 is a schematic cross-sectional view along line IV-IV in FIG. 1. FIG. 5 is a perspective view schematically showing an electrode body attached to a sealing plate. FIG. 6 is a perspective view schematically showing an electrode body to which a positive electrode second current collecting unit and a negative electrode second current collecting unit are attached. FIG. 7 is a schematic view showing a configuration of a wound electrode body of the secondary battery according to the present embodiment. FIG. 8 is a front view schematically showing the wound electrode body of FIG. 7. FIG. 9 is a schematic vertical cross-sectional view along line IX-IX in FIG. 8. Also, for convenience of explanation, description of a separator 30 (see FIG. 7, etc.) will be omitted in FIG. 9.

As shown in FIG. 2, a secondary battery 100 according to the present embodiment includes a wound electrode body 40, and a battery case 50 that houses the wound electrode body 40. A specific configuration of the secondary battery 100 will be described below.

(1) Battery Case

The battery case 50 is a casing for housing the wound electrode body 40. Although not shown, a non-aqueous electrolytic solution is also housed inside the battery case 50. As shown in FIG. 1, the battery case 50 in the present embodiment has a flat and bottomed rectangular parallelepiped (quadrangular) outer shape. Also, a conventionally known material can be used for the battery case 50 without particular limitation. For example, the battery case 50 may be made of a metal. As an example of the material of the battery case 50, aluminum, an aluminum alloy, iron, an iron alloy, or the like can be exemplified.

The battery case 50 includes an exterior body 52 and a sealing plate 54. The exterior body 52 is a flat bottomed quadrangular container having an opening 52h on an upper surface thereof. As shown in FIGS. 1 and 2, the exterior body 52 includes a bottom wall 52a having a substantially rectangular shape in a plan view, a pair of long side walls 52b extending upward in the height direction Z from long sides of the bottom wall 52a, and a pair of short side walls 52c extending upward in the height direction Z from short sides of the bottom wall 52a. Also, as will be described in detail later, line-shaped recessed portions 52d extending in the width direction Y are formed on the long side walls 52b of the exterior body 52 in the present embodiment. On the other hand, the sealing plate 54 is a plate-shaped member having a substantially rectangular shape in a plan view, which closes the opening 52h of the exterior body 52. In addition, an outer peripheral edge portion of the sealing plate 54 is joined (for example, welded) to an outer peripheral edge portion of the opening 52h of the exterior body 52. Thus, the battery case 50 whose inside is airtightly sealed is produced. Further, the sealing plate 54 is provided with a liquid injection hole 55 and a gas discharge valve 57. The liquid injection hole 55 is a through hole provided for injecting a non-aqueous electrolytic solution into the inside of the battery case 50 after sealing. In addition, the liquid injection hole 55 is sealed by a sealing member 56 after the non-aqueous electrolytic solution is injected. Further, the gas discharge valve 57 is a thinned portion designed to break (open) when a large amount of gas is generated in the battery case 50, thereby discharging the gas.

(2) Non-Aqueous Electrolytic Solution

As described above, in addition to the wound electrode body 40, a non-aqueous electrolytic solution (not shown) is also housed inside the battery case 50. For the non-aqueous electrolytic solution, those used in conventionally known secondary batteries can be used without particular limitation. For example, the non-aqueous electrolyte solution is prepared by dissolving a supporting salt in a non-aqueous solvent. As an example of the non-aqueous solvent, carbonate solvents such as ethylene carbonate, dimethyl carbonate, and ethyl methyl carbonate can be exemplified. As an example of the supporting salt, a fluorine-containing lithium salt such as $LiPF_6$ can be exemplified.

(3) Electrode Terminal

Further, a positive electrode terminal 60 is attached to one end portion (on a left side in FIGS. 1 and 2) of the sealing plate 54 in the width direction Y. The positive electrode terminal 60 is connected to a plate-shaped positive electrode external conductive member 62 outside the battery case 50. On the other hand, the negative electrode terminal 65 is attached to the other end portion (on a right side in FIGS. 1 and 2) of the sealing plate 54 in the width direction Y. A plate-shaped negative electrode external conductive member 67 is attached to the negative electrode terminal 65. These external conductive members (the positive electrode external conductive member 62 and the negative electrode external conductive member 67) are connected to another secondary battery and an external device via an external connection member (a bus bar or the like). Also, the external conductive members are preferably made of a metal having excellent conductivity (aluminum, an aluminum alloy, copper, a copper alloy, etc.).

(4) Electrode Current Collecting Unit

As shown in FIGS. 3 to 5, in the secondary battery 100 according to the present embodiment, a plurality of (three) wound electrode bodies 40 are housed in the battery case 50. Although the detailed structure will be described later, each wound electrode body 40 is provided with a positive electrode tab group 42 and a negative electrode tab group 44. The positive electrode terminal 60 described above is connected to each positive electrode tab group 42 of the plurality of wound electrode bodies 40 via a positive electrode current collecting unit 70. Specifically, the positive electrode current collecting unit 70 is housed inside the battery case 50. As shown in FIGS. 2 and 5, the positive electrode current collecting unit 70 includes a positive electrode first current collecting unit 71 that is a plate-shaped conductive member extending in the width direction Y along an inner surface of the sealing plate 54, and a plurality of positive electrode second current collecting units 72 that are plate-shaped conductive members extending in the height direction Z. In addition, a lower end portion 60c of the positive electrode terminal 60 is inserted into the battery case 50 through a terminal insertion hole 58 of the sealing plate 54 and is connected to the positive electrode first current collecting unit 71 (see FIG. 2). On the other hand, as shown in FIGS. 4 to 6, the secondary battery 100 is provided with a number of positive electrode second current collecting units 72 corresponding to the number of wound electrode bodies 40. Each positive electrode second current collecting unit 72 is connected to one positive electrode tab group 42 of the wound electrode bodies 40. In addition, as shown in FIGS. 4 and 5, each positive electrode tab group 42 of the wound electrode bodies 40 is bent such that the positive electrode second current collecting units 72 and one side surfaces 40a of the wound electrode bodies 40 face each other. As a result, upper end portions of the positive electrode second current collecting units 72 and the positive electrode first current collecting unit 71 are electrically connected.

On the other hand, the negative electrode terminal 65 is connected to each negative electrode tab group 44 of the plurality of wound electrode bodies 40 via a negative electrode current collecting unit 75. Such a connection structure on the negative electrode side is substantially the same as the connection structure on the positive electrode side described above. Specifically, the negative electrode current collecting unit 75 includes a negative electrode first current collecting unit 76 that is a plate-shaped conductive member extending in the width direction Y along the inner surface of the sealing plate 54, and a plurality of negative electrode second current collecting units 77 that are plate-shaped conductive members extending in the height direction Z (see FIGS. 2 and 5). In addition, a lower end portion 65c of the negative electrode terminal 65 is inserted into the battery case 50 through a terminal insertion hole 59 and connected to the negative electrode first current collecting unit 76 (see FIG. 2). On the other hand, each of the plurality of negative electrode second current collecting units 77 is connected to one negative electrode tab group 44 of the wound electrode bodies 40 (see FIGS. 4 to 6). In addition, each negative electrode tab group 44 is bent such that the negative electrode second current collecting units 77 and the other side surfaces 40b of the wound electrode bodies 40 face each other. Thus, upper end portions of the negative electrode second current collecting units 77 and the negative electrode first current collecting unit 76 are electrically connected. Further, a metal having excellent conductivity (aluminum, an aluminum alloy, copper, a copper alloy, etc.) can be appropriately used for the electrode current collecting units (the positive electrode current collecting unit 70 and the negative electrode current collecting unit 75).

(5) Insulation Member

Also, in the present secondary battery 100, various insulating members for preventing conduction between the wound electrode bodies 40 and the battery case 50 are attached. Specifically, an external insulating member 92 is interposed between the positive electrode external conductive member 62 (negative electrode external conductive member 67) and an outer surface of the sealing plate 54 (see FIG. 1). Thus, it is possible to prevent the positive electrode external conductive member 62 and the negative electrode external conductive member 67 from conducting with the sealing plate 54. In addition, a gasket 90 is mounted on each of the terminal insertion holes 58 and 59 of the sealing plate 54 (see FIG. 2). Thus, it is possible to prevent the positive electrode terminal 60 (or the negative electrode terminal 65) inserted through the terminal insertion holes 58 and 59 from conducting with the sealing plate 54. Further, an internal insulating member 94 is disposed between the positive electrode first current collecting unit 71 (or the negative electrode first current collecting unit 76) and an inner surface of the sealing plate 54. This internal insulating member 94 includes a plate-shaped base portion 94a interposed between the positive electrode first current collecting unit 71 (or the negative electrode first current collecting unit 76) and the inner surface of the sealing plate 54. Thus, it is possible to prevent the positive electrode first current collecting unit 71 and the negative electrode first current collecting unit 76 from conducting with the sealing plate 54. Further, the internal insulating member 94 includes an insulating protrusion 94b that protrudes from the inner surface of the sealing plate 54 toward the wound electrode bodies 40 (see FIGS. 2 and 3). Thus, movements of the wound electrode bodies 40 in the height direction Z can be restricted, and direct contact between the wound electrode bodies 40 and the sealing plate 54 can be prevented. In addition, the plurality of wound electrode bodies 40 are housed inside the battery case 50 in a state in which they are covered with an electrode body holder 98 (see FIG. 3) made of an insulating resin sheet. Thus, direct contact between the wound electrode bodies 40 and the exterior body 52 can be prevented. Also, the material of each of the above-mentioned insulating members is not particularly limited as long as it has a predetermined insulating property. As an example, synthetic resin materials such as a polyolefin resin (for example, polypropylene (PP) or polyethylene (PE)) and a fluororesin (for example, a perfluoroalkoxy alkane (PFA), or polytetrafluoroethylene (PTFE)) can be used.

(6) Wound Electrode Body

As shown in FIG. 7, the electrode body used in the secondary battery 100 according to the present embodiment is a wound electrode body 40 in which a positive electrode plate 10 and a negative electrode plate 20 are wound via a separator 30. This wound electrode body 40 is housed in the battery case 50 such that a winding axis WL of the wound electrode body 40 and the width direction Y of the secondary battery 100 substantially coincide with each other. That is, a "winding axis direction" in the following description is substantially the same as the width direction Y in the figures. A configuration of the wound electrode body 40 will be specifically described below.

(a) Positive Electrode Plate

As shown in FIG. 7, the positive electrode plate 10 is an elongated band-shaped member. A thickness of the positive electrode plate 10 is preferably 28 µm to 420 µm, more preferably 50 µm to 178 µm, and further preferably 112 µm to 165 µm. The positive electrode plate 10 includes a positive electrode core body 12 that is a band-shaped metal foil, and a positive electrode active material layer 14 applied to a surface of the positive electrode core body 12. Also, from the viewpoint of battery performance, the positive electrode active material layer 14 is preferably applied to both surfaces of the positive electrode core body 12. Further, in the positive electrode plate 10, a positive electrode tab 12t protrudes outward (leftward in FIG. 7) from one end side thereof in the winding axis direction (width direction Y). In addition, a plurality of positive electrode tabs 12t are formed at predetermined intervals in the longitudinal direction L of the elongated band-shaped positive electrode plate 10. The positive electrode tab 12t is a region in which the positive electrode active material layer 14 is not provided and the positive electrode core body 12 is exposed. Moreover, a protective layer 16 extending in the longitudinal direction L of the positive electrode plate 10 is formed in a region adjacent to the end side of the positive electrode plate 10 on the positive electrode tab 12t side. Also, a width of the positive electrode active material layer 14 in the width direction Y is preferably 200 mm to 400 mm, more preferably 250 mm to 350 mm, and further preferably 260 mm to 300 mm.

A metal material having a predetermined conductivity can be preferably used for the positive electrode core body 12. The positive electrode core body 12 is preferably made of, for example, aluminum, an aluminum alloy, or the like. Further, a thickness of the positive electrode core body 12 is preferably 8 µm to 20 µm, more preferably 10 µm to 18 µm, and further preferably 12 µm to 15 µm.

The positive electrode active material layer 14 is a layer containing a positive electrode active material. For the positive electrode active material, a material capable of reversibly storing and releasing charge carriers is used. Also, the positive electrode active material layer 14 may contain additives such as a conductive material and a binder in addition to the positive electrode active material. In addition, for each material contained in the positive electrode active material layer 14 (the positive electrode active material, the conductive material, the binder, etc.), conventionally known materials that can be used in general secondary batteries (for example, lithium ion secondary batteries) can be used without particular limitation, which does not limit the technique disclosed herein, and thus detailed description thereof will be omitted. Further, when the total solid content of the positive electrode active material layer 14 is set to 100% by mass, the content of the positive electrode active material is approximately 80% by mass or more, and typically 90% by mass or more. Moreover, a thickness of the positive electrode active material layer 14 on one side of the positive electrode core body 12 is preferably 10 µm to 100 µm, more preferably 20 µm to 80 µm, and further preferably 50 µm to 75 µm. Also, the "thickness of the positive electrode active material layer" in the present specification indicates a dimension of the positive electrode active material layer in a direction perpendicular to the flat portion 40f of the wound electrode body 40 (that is, the depth direction X).

The protective layer 16 is a layer configured to have lower electrical conductivity than the positive electrode active material layer 14. By providing the protective layer 16 in the region adjacent to the end side of the positive electrode plate 10, it is possible to prevent an internal short circuit due to direct contact between the positive electrode core body 12 and a negative electrode active material layer 24 when the separator 30 is damaged. For example, as the protective layer 16, a layer containing insulating ceramic particles and a binder is preferably formed. For materials contained in the protective layer 16 (ceramic particles, a binder, etc.), conventionally known materials that can be used in general secondary batteries (for example, lithium ion secondary batteries) can also be used without particular limitation, which does not limit the technique disclosed herein, and thus detailed description thereof will be omitted. Also, the protective layer is not an essential component of the positive electrode plate in the technique disclosed herein. That is, in the secondary battery disclosed herein, a positive electrode plate on which a protective layer is not formed can also be used.

(b) Negative Electrode Plate

As shown in FIG. 7, the negative electrode plate 20 is an elongated band-shaped member. A thickness of the negative electrode plate 20 is preferably 24 µm to 420 µm, more preferably 106 µm to 215 µm, and further preferably 158 µm to 185 µm. The negative electrode plate 20 includes a negative electrode core body 22 that is a band-shaped metal foil, and a negative electrode active material layer 24 provided on a surface of the negative electrode core body 22. Also, from the viewpoint of battery performance, the negative electrode active material layer 24 is preferably applied to both surfaces of the negative electrode core body 22. Further, the negative electrode plate 20 is provided with a negative electrode tab 22t that protrudes outward (rightward in FIG. 7) from one end side thereof in the winding axis direction (width direction Y). A plurality of the negative electrode tabs 22t are provided at predetermined intervals in the longitudinal direction L of the negative electrode plate 20. The negative electrode tab 22t is a region in which the negative electrode active material layer 24 is not provided and the negative electrode core body 22 is exposed. In addition, a width of the negative electrode active material layer 24 in the width direction Y is preferably 200 mm to 400 mm, more preferably 250 mm to 350 mm, and further preferably 260 mm to 300 mm.

A metal material having a predetermined conductivity can be preferably used for the negative electrode core body 22. The negative electrode core body 22 is preferably made of, for example, copper or a copper alloy. Also, a thickness of the negative electrode core body 22 is preferably 4 µm to 20 µm, more preferably 6 µm to 15 µm, and further preferably 8 µm to 10 µm.

The negative electrode active material layer 24 is a layer containing a negative electrode active material. For the negative electrode active material, a material capable of reversibly storing and releasing charge carriers in relation to the positive electrode active material described above can be used. Also, the negative electrode active material layer 24 may contain additives such as a binder and a thickener in addition to the negative electrode active material. For each material contained in the negative electrode active material layer 24 (the negative electrode active material, the binder, the thickener, etc.), conventionally known materials that can be used in general secondary batteries (for example, lithium ion secondary batteries) can be used without particular limitation, which does not limit the technique disclosed herein, and thus detailed description thereof will be omitted. Further, when the total solid content of the negative electrode active material layer 24 is set to 100% by mass, the content of the negative electrode active material is approximately 30% by mass or more, and typically 50% by mass or more. Also, the negative electrode active material may occupy 80% by mass or more of the negative electrode active material layer 24, or may occupy 90% by mass or more. Moreover, a thickness of the negative electrode active material layer 24 on one surface of the negative electrode core body 22 is preferably 10 µm to 200 µm, more preferably 20 µm to 100 µm, and further preferably 75 µm to 85 µm.

(c) Separator

The wound electrode body 40 in the present embodiment includes two separators 30. These separators 30 are interposed between the positive electrode plate 10 and the negative electrode plate 20. This can prevent the contact between the positive electrode plate 10 and the negative electrode plate 20. Further, the separators 30 have a function of passing charge carriers (for example, lithium ions). As an example of such a separator 30, insulating sheets in which a plurality of fine pores through which charge carriers can pass are formed can be exemplified. As for the separator 30, those used in conventionally known secondary batteries can be used without particular limitation, which does not limit the technique disclosed herein, and thus detailed description thereof will be omitted. In addition, a thickness of the separator 30 is preferably 4 µm to 30 µm, more preferably 6 µm to 20 µm, and further preferably 8 µm to 16 µm.

(d) Structure of Wound Electrode Body

Next, a specific structure of the wound electrode body 40 including the positive electrode plate 10, the negative electrode plate 20, and the separator 30 described above will be described. The wound electrode body 40 is produced by stacking and winding the positive electrode plate 10 and the negative electrode plate 20 with the two separators 30 interposed therebetween. Specifically, first, a stacked body in which the separator 30, the negative electrode plate 20, the separator 30, and the positive electrode plate 10 are stacked in order is produced (see FIG. 7). In this case, stacking positions of each sheet member in the width direction Y are adjusted such that only the positive electrode tab 12t of the positive electrode plate 10 protrudes from one side edge thereof in the width direction Y (leftward in FIG. 7), and only the negative electrode tab 22t of the negative electrode plate 20 protrudes from the other side edge (rightward in FIG. 7). Then, the produced stacked body is wound to produce a tubular body. The number of windings in this case is preferably adjusted as appropriate in consideration of performance of a target wound electrode body 40, manufacturing efficiency, and the like. As an example, the number of windings of the wound electrode body 40 is preferably 10 to 60 times, and more preferably 30 to 40 times. Then, by press-molding this tubular body, a flat-shaped wound electrode body 40 is produced. Then, as shown in FIG. 8, the separator 30 is disposed on an outermost peripheral surface of the wound electrode body 40 after production. By attaching winding stop tapes 38 to a terminating end portion 30e of the separator 30, the shape of the wound electrode body 40 is maintained.

As shown in FIG. 9, in the wound electrode body 40 after production, one end portion of the band-shaped positive electrode plate 10 in the longitudinal direction L is disposed as the positive electrode starting end portion 10s on an inner side of the wound electrode body 40. Then, the other end portion of the positive electrode plate 10 is disposed as a positive electrode terminating end portion 10e on an outer side of the wound electrode body 40. Similarly, one end portion of the band-shaped negative electrode plate 20 is disposed as the negative electrode starting end portion 20s on an inner side of the wound electrode body 40. Further, the other end portion of the negative electrode plate 20 is disposed as a negative electrode terminating end portion 20e on an outer side of the wound electrode body 40. Also, although not shown in FIG. 9, the positive electrode active material layer 14 (see FIG. 7) is provided up to both end portions (the positive electrode starting end portion 10s and the positive electrode terminating end portion 10e) of the positive electrode plate 10 in the longitudinal direction L. Similarly, the negative electrode active material layer 24 (see FIG. 7) is provided up to both end portions (the negative electrode starting end portion 20s and the negative electrode terminating end portion 20e) of the negative electrode plate 20 in the longitudinal direction L.

Further, as shown in FIG. 8, the positive electrode tab group 42 in which the plurality of positive electrode tabs 12t with the exposed positive electrode core body 12 are stacked is formed at one end portion of the wound electrode body 40 after production in the winding axis direction (width direction Y). On the other hand, the negative electrode tab group 44 in which the plurality of negative electrode tabs 22t with the exposed negative electrode core body 22 are stacked is formed at the other end portion of the wound electrode body 40 in the winding axis direction (width direction Y). On the other hand, a core portion 46 in which the positive electrode active material layer 14 and the negative electrode active material layer 24 face each other is formed at a central portion of the wound electrode body 40 in the width direction Y. The core portion 46 is a main place in which the charge and discharge reaction occurs. Here, as described above, the positive electrode tab group 42 in the present embodiment is connected to the positive electrode second current collecting unit 72, and then is bent such that the positive electrode second current collecting unit 72 faces the side surface 40a of the wound electrode body 40 (see FIGS. 4 to 6). Similarly, the negative electrode tab group 44 is connected to the negative electrode second current collecting unit 77, and then is bent such that the negative electrode second current collecting unit 77 faces the side surface 40b of the wound electrode body 40. By providing the positive electrode tab group 42 (and the negative electrode tab group 44) that can be bent in this way, a volume of the core portion 46 (charge and discharge region) with respect to an internal capacity of the battery case 50 can be increased, which thus can contribute to improvement of battery performance.

As described above, the wound electrode body 40 in the present embodiment is molded into a flat shape by press-molding. As shown in FIGS. 3 and 9, the flat-shaped wound electrode body 40 has a pair of curved portions 40r each having a curved outer surface, and a flat portion 40f having a flat outer surface connecting the pair of curved portions 40r. As shown in FIG. 3, when the wound electrode body 40 is housed in the battery case 50, the flat portion 40f faces a long side wall 52b of the exterior body 52 (that is, a flat surface of the battery case 50). Further, the upper curved portion 40r faces the sealing plate 54, and the lower curved portion 40r faces the bottom wall 52a of the exterior body 52.

Here, as shown in FIG. 9, in the wound electrode body 40 having the above configuration, an insufficiently stacked region 48 in which the number of layers of the positive electrode plate 10 or the negative electrode plate 20 is smaller than in other regions in the flat portion 40f may be generated, and precipitation of metal Li may be promoted in the vicinity of the insufficiently stacked region 48. Specifically, when the flat-shaped wound electrode body 40 is produced, it is very difficult to align and dispose both of the positive electrode starting end portion 10s and the negative electrode starting end portion 20s (particularly the positive electrode starting end portion 10s) in the curved portion 40r. For this reason, in the wound electrode body 40 of this type, the insufficiently stacked region 48, which has the total number of layers of the electrode plates smaller than other regions of the flat portion 40f, is likely to be generated in the vicinity of the positive electrode starting end portion 10s in the flat portion 40f. Then, the secondary battery 100 of this type is usually used in a state in which the flat surface (long side wall 52b of the exterior body 52) of the battery case 50 is pressed to be sandwiched and the flat portion 40f of the wound electrode body 40 is pressed. As a result, an inter-electrode distance between the positive electrode plate 10 and the negative electrode plate 20 inside the wound electrode body 40 becomes smaller, and thus electrical resistance is reduced. However, since the pressure from the outside of the battery case 50 is not sufficiently transmitted to the insufficiently stacked region 48 described above, the inter-electrode distance locally increases and the electrical resistance increases. As a result, current concentration occurs around the insufficiently stacked region 48, and the metal Li is precipitated on a surface of the negative electrode active material layer 24. Further, in a region in which the inter-electrode distance is large, a gas decomposed by the non-aqueous electrolytic solution tends to accumulate. For this reason, when charging and discharging are repeated, the electrical resistance in the insufficiently stacked region 48 further increases, and the precipitation of metal Li is further promoted. On the other hand, in the secondary battery 100 according to the present embodiment, as shown in FIG. 3, protruding portions 52e protruding toward the insufficiently stacked region 48 of the wound electrode body 40 are formed on inner surfaces of the battery case 50 (exterior body 52). Since the protruding portions 52e locally press the insufficiently stacked region 48, it is possible to prevent a local increase in the inter-electrode distance due to pressing failure of the insufficiently stacked region 48. As a result, it is possible to prevent the current concentration from occurring around the insufficiently stacked region 48 and appropriately inhibit the precipitation of metal Li.

Also, as will be described in detail later, in the present embodiment, the wound electrode body 40 is housed in the battery case 50, and then the protruding portions 52e are formed by performing a pressing step of pressing the insufficiently stacked region 48 from the outside of the battery case 50. For this reason, the recessed portions 52d corresponding to the protruding portions 52e are formed on outer surfaces of the battery case 50 in the present embodiment (see FIGS. 1 and 3). As a result, since a positional displacement between the insufficiently stacked region 48 and the protruding portion 52e can be inhibited, the Li precipitation resistance can be further improved.

Further, as described above, the insufficiently stacked region 48 is formed in the vicinity of the positive electrode starting end portion 10s in the flat portion 40f, and thus, as shown in FIG. 8, it extends along the winding axis (width direction Y) of the wound electrode body 40. From the viewpoint of appropriately preventing the pressing failure in the insufficiently stacked region 48, the protruding portions 52e are preferably formed to extend along the winding axis (width direction Y) of the wound electrode body 40. In this case, as shown in FIG. 1, the line-shaped recessed portions 52d extending in the width direction Y are formed on the long side walls 52b of the exterior body 52. However, formation regions of the protruding portions 52e in the width direction Y are not particularly limited and can be changed as appropriate. For example, a plurality of protruding portions 52e may be arranged in the width direction Y at predetermined intervals. Even in a case in which such a dotted line-shaped protruding portion 52e is formed, it is possible to sufficiently prevent the pressing failure in the insufficiently stacked region 48. Also, the protruding portions 52e may be formed only at a part thereof in the width direction Y. As described above, in a case in which the protruding portions 52e are formed only at a part thereof in the width direction Y, the protruding portions 52e are preferably formed at a central portion thereof in the width direction Y.

Further, the protruding portion 52e is formed to be able to press at least a part of the insufficiently stacked region 48 in the direction (height direction Z) along the flat portion 40f. That is, a dimension of the protruding portion 52e in the height direction Z may be larger or smaller than a dimension of the insufficiently stacked region 48 in the height direction Z. Also, from the viewpoint of efficiently eliminating the pressing failure of the insufficiently stacked region 48, a height dimension of the protruding portion 52e is preferably about the same as a height dimension of the insufficiently stacked region 48. For example, a ratio of the height dimension of the protruding portion 52e to the height dimension of the insufficiently stacked region 48 is preferably 0.25 to 1.75, more preferably 0.5 to 1.5, further preferably 0.75 to 1.25, and particularly preferably 0.9 to 1.1. Also, exemplifying each height dimension, the height dimension of the insufficiently stacked region 48 is preferably 5 mm or less, more preferably 4.5 mm or less, and particularly preferably 4 mm or less. As the height dimension of the insufficiently stacked region 48 decreases, the precipitation of metal Li is less likely to occur. Also, a lower limit of the height dimension of the insufficiently stacked region 48 is not particularly limited and may be 1 mm or more, or 1.5 mm or more. On the other hand, the height dimension of the protruding portion 52e is preferably 5 mm or less, more preferably 4.5 mm or less, and particularly preferably 4 mm or less. Thus, since a local stress is easily applied to the insufficiently stacked region 48, the Li precipitation resistance can be further improved. On the other hand, from the viewpoint of appropriately pressing the insufficiently stacked region 48, a lower limit of the height dimension of the protruding portion 52e is preferably 1.5 mm or more, and particularly preferably 2 mm or more.

Figure 10:
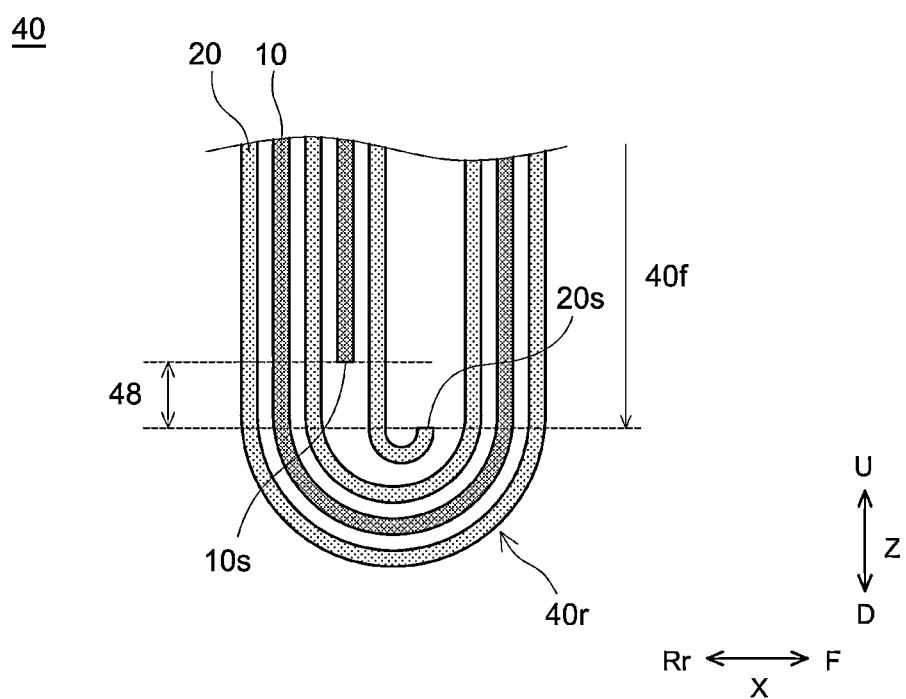
FIG. 10 is a schematic vertical cross-sectional view schematically showing another example of the wound electrode body.

Further, the formation positions of the insufficiently stacked region and the protruding portion in the technique disclosed herein are not particularly limited as long as they are in the vicinity of the positive electrode starting end portion. For example, in the wound electrode body 40 having the configuration shown in FIG. 9, the insufficiently stacked region 48 is formed between the positive electrode starting end portion 10s and the negative electrode starting end portion 20s in the direction in which the flat portion 40f extends (that is, in the height direction Z). In this case, by providing the protruding portion 52e to press the portion between the positive electrode starting end portion 10s and the negative electrode starting end portion 20s, it is possible to prevent an increase in the inter-electrode distance of the insufficiently stacked region 48 and appropriately inhibit the precipitation of metal Li. Also, in the wound electrode body 40 having the configuration shown in FIG. 9, the insufficiently stacked region 48 is generated in the vicinity of the curved portion 40r on a lower side in the height direction Z. However, the position at which the insufficiently stacked region 48 is formed is not limited to the vicinity of the lower curved portion 40r. For example, in a case in which the wound electrode body is produced such that the positive electrode starting end portion is disposed in the vicinity of the upper curved portion, the insufficiently stacked region is formed in the vicinity of the upper curved portion. In this case, by forming the protruding portions to press the vicinity of the upper curved portion, the precipitation of metal Li can be appropriately inhibited. In addition, as shown in FIG. 10, even in a case in which a configuration of the negative electrode plate 20 being folded back in the curved portion 40r is adopted, the insufficiently stacked region 48 is formed in the vicinity of the positive electrode starting end portion 10s. Specifically, in the wound electrode body 40 shown in FIG. 10, the insufficiently stacked region 48, in which the total number of layers of the electrode plates is insufficient, is formed between the positive electrode starting end portion 10s and the negative electrode starting end portion 20s of the negative electrode plate 20 after being folded back. For this reason, even in the wound electrode body 40 having such a configuration, the protruding portion 52e is preferably formed to be able to press the vicinity of the positive electrode starting end portion 10s. As a result, the precipitation of metal Li in the vicinity of the insufficiently stacked region 48 can be appropriately inhibited.

Further, a protruding dimension of the protruding portion 52e is preferably appropriately adjusted in consideration of the thickness of the positive electrode plate 10. Specifically, as shown in FIGS. 9 and 10, in the insufficiently stacked region 48, the number of layers of the positive electrode plate 10 is usually one layer less than in other regions. For this reason, the protruding dimension of the protruding portion 52e is preferably adjusted to be about the same as the thickness of the positive electrode plate 10. As a result, the pressing failure in the insufficiently stacked region 48 is appropriately eliminated, and the precipitation of metal Li can be more appropriately inhibited. For example, a ratio of the protruding dimension of the protruding portion 52e to the thickness of the positive electrode plate 10 is preferably 0.25 to 1.75, more preferably 0.5 to 1.5, further preferably 0.75 to 1.25, and particularly preferably 0.9 to 1.1. Further, specifically, the protruding dimension of the protruding portion 52e is preferably 0.04 mm or more, more preferably 0.05 mm or more, further preferably 0.07 mm or more, and particularly preferably 0.1 mm or more. On the other hand, from the viewpoint of reliably preventing the wound electrode body 40 from being damaged by the protruding portion 52e, an upper limit of the protruding dimension of the protruding portion 52e is preferably 1 mm or less, more preferably 0.5 mm or less, and further preferably 0.3 mm or less. Also, the "protruding dimension of the protruding portion" in the present specification indicates a height of an apex of the protruding portion with respect to a straight line connecting an upper end and a lower end of the long side wall of the exterior body.

Further, as described above, in the wound electrode body 40 in the present embodiment, the positive electrode starting end portion 10s is disposed in the vicinity of the curved portion 40r on the lower side in the height direction Z (see FIG. 9). In this case, the positive electrode terminating end portion 10e is preferably disposed at a position close to the upper curved portion 40r. As a result, since it is possible to prevent the positive electrode starting end portion 10s and the positive electrode terminating end portion 10e from coming closer to each other in a circumferential direction of the wound electrode body 40, a surface pressure distribution for the flat portion 40f can be made uniform, and a stable charge and discharge reaction can be generated. Also, a relationship between the starting end portion and the terminating end portion described above is the same for the negative electrode plate 20. That is, in a case in which the negative electrode starting end portion 20s is disposed in the vicinity of the curved portion 40r on the lower side in the height direction Z, the negative electrode terminating end portion 20e is preferably disposed at a position close to the upper curved portion 40r.

Further, as described in the present embodiment, the positive electrode terminating end portion 10e and the negative electrode terminating end portion 20e are preferably disposed in the curved portion 40r (for example, the upper curved portion 40r). As a result, it is possible to prevent a step caused by the positive electrode terminating end portion 10e and the negative electrode terminating end portion 20e from being generated on the surface of the flat portion 40f, and thus the surface pressure distribution in the flat portion 40f can be further made uniform. Also, the negative electrode terminating end portion 20e preferably extends from the positive electrode terminating end portion 10e on the outermost circumference of the wound electrode body 40 such that the positive electrode terminating end portion 10e is covered with the negative electrode plate 20. In this way, by making the negative electrode plate 20 longer than the positive electrode plate 10 and sufficiently ensuring storage performance of charge carriers on the negative electrode side, the Li precipitation resistance can be further improved. In addition, in a case in which the positive electrode starting end portion 10s and the negative electrode starting end portion 20s are disposed in the curved portion 40r, an adhesive layer is preferably provided on a surface of the separator 30 (see FIG. 7). As a result, in the wound electrode body 40 after production, it is possible to prevent the positive electrode starting end portion 10s and the negative electrode starting end portion 20s from deviating from the curved portion 40r.

2. Method for Manufacturing Secondary Battery

The structure of the secondary battery 100 according to the present embodiment has been described above. Next, an example of a method for manufacturing the secondary battery 100 will be described. Further, the method for manufacturing the secondary battery 100 according to the present embodiment includes (1) a winding step, (2) a molding step, (3) a housing step, and (4) a pressing step.

(1) Winding Step

In the present step, a tubular wound body in which the positive electrode plate 10 and the negative electrode plate 20 are wound with the separator 30 interposed therebetween is produced. Specifically, first, a stacked body is produced in which the separator 30, the negative electrode plate 20, the separator 30, and the positive electrode plate 10 are stacked in order (see FIG. 7). In this case, stacking positions of each sheet member are adjusted such that the positive electrode tabs 12t protrude from one side edge of the stacked body and the negative electrode tabs 22t protrude from the other side edge. Then, by winding the stacked body, the tubular wound body (cylindrical body) is produced.

(2) Molding Step

In the present step, the tubular body after winding is pressure-molded and the tubular body is crushed. As a result, the flat-shaped wound electrode body 40 (see FIG. 9) having the pair of curved portions 40r and the flat portion 40f is produced. Then, as shown in FIG. 8, winding stop tapes 38 are attached to the terminating end portion 30e of the separator 30 disposed on the outermost circumferential surface. As a result, the shape of the flat-shaped wound electrode body 40 is maintained. Here, in a general method for manufacturing a secondary battery, as a result of crushing the wound body in the present step, a displacement in arrangement position between the positive electrode starting end portion 10s and the negative electrode starting end portion 20s occurs, and the insufficiently stacked region 48 in which the total number of layers of the electrode plates is insufficient is generated in the vicinity of the positive electrode starting end portion 10s.

(3) Molding Step

In the present step, the flat-shaped wound electrode body 40 is housed inside the battery case 50. Specifically, as shown in FIG. 6, the positive electrode second current collecting unit 72 is connected to the positive electrode tab group 42 of the wound electrode body 40, and the negative electrode second current collecting unit 77 is connected to the negative electrode tab group 44. Then, as shown in FIG. 5, a plurality of (three in the figure) wound electrode bodies 40 are arranged such that the flat portions 40f face each other. Then, the sealing plate 54 is disposed above the plurality of wound electrode bodies 40, and the positive electrode tab group 42 of each wound electrode body 40 is bent such that the positive electrode second current collecting unit 72 and one side surface 40a of the wound electrode body 40 face each other. Thus, the positive electrode first current collecting unit 71 is connected to the positive electrode second current collecting unit 72. Similarly, the negative electrode tab group 44 of each wound electrode body 40 is bent such that the negative electrode second current collecting unit 77 and the other side surface 40b of the wound electrode body 40 face each other. Thus, the negative electrode first current collecting unit 76 is connected to the negative electrode second current collecting unit 77. As a result, the wound electrode body 40 is attached to the sealing plate 54 via the positive electrode current collecting unit 70 and the negative electrode current collecting unit 75.

Next, the surface of the wound electrode body 40 attached to the sealing plate 54 is covered with the electrode body holder 98 (see FIG. 3) and then housed inside the exterior body 52. Then, the flat portion 40f of the wound electrode body 40 housed inside the exterior body 52 faces the long side wall 52b (that is, the flat surface of the battery case 50). After that, the opening 52h on the upper surface of the exterior body 52 is closed with the sealing plate 54, and then the exterior body 52 and the sealing plate 54 are joined (welded) to construct the battery case 50. After that, the electrolytic solution is injected into the battery case 50 from the liquid injection hole 55 of the sealing plate 54, and the liquid injection hole 55 is closed with the sealing member 56. As a result, the inside of the battery case 50 is sealed.

(4) Pressing Step

Next, in the manufacturing method according to the present embodiment, a pressing step of pressing the insufficiently stacked region 48 of the wound electrode body 40 housed in the battery case 50 from the outside of the battery case 50 to deform the battery case 50 is performed. As a result of performing such a pressing step, the protruding portions 52e protruding toward the insufficiently stacked region 48 are formed on the inner surfaces of the battery case 50 (see FIG. 3). In addition, the recessed portions 52d corresponding to the protruding portions 52e are formed on the outer surfaces of the battery case 50 (see FIG. 1). In this way, by forming the protruding portions 52e after the wound electrode body 40 has been housed in the battery case 50, it is possible to prevent the positional displacement between the insufficiently stacked region and the protruding portions from occurring in the housing step, and thus the Li precipitation resistance can be further improved. Further, as compared with the form in which the protruding portions are formed in advance on the inner surfaces of the battery case (exterior body), the wound electrode body can be easily housed inside the battery case, and thus it can also contribute to the improvement of manufacturing efficiency.

Also, in consideration of rigidity of the battery case 50 and the like, a pressing force in the pressing step is preferably appropriately adjusted to form the protruding portion having an appropriate protruding dimension. For example, in a case in which an aluminum battery case having a thickness of 0.8 mm is used, the pressing force in the present step is preferably 3 kN or more, more preferably 6 kN or more, further preferably 8 kN or more, and particularly preferably 10 kN or more. On the other hand, an upper limit of the pressing force in the present step is not particularly limited as long as the battery case and the wound electrode body are not damaged. For example, the upper limit of the pressing force may be 100 kN or less, 50 kN or less, or 30 kN or less.

Other Embodiments

One embodiment of the technique disclosed herein has been described above. Also, the above-described first embodiment shows an example to which the technique disclosed herein is applied and does not limit the technique disclosed herein. Other embodiments of the technique disclosed herein will be described below.

(1) Second Embodiment

Figure 11:
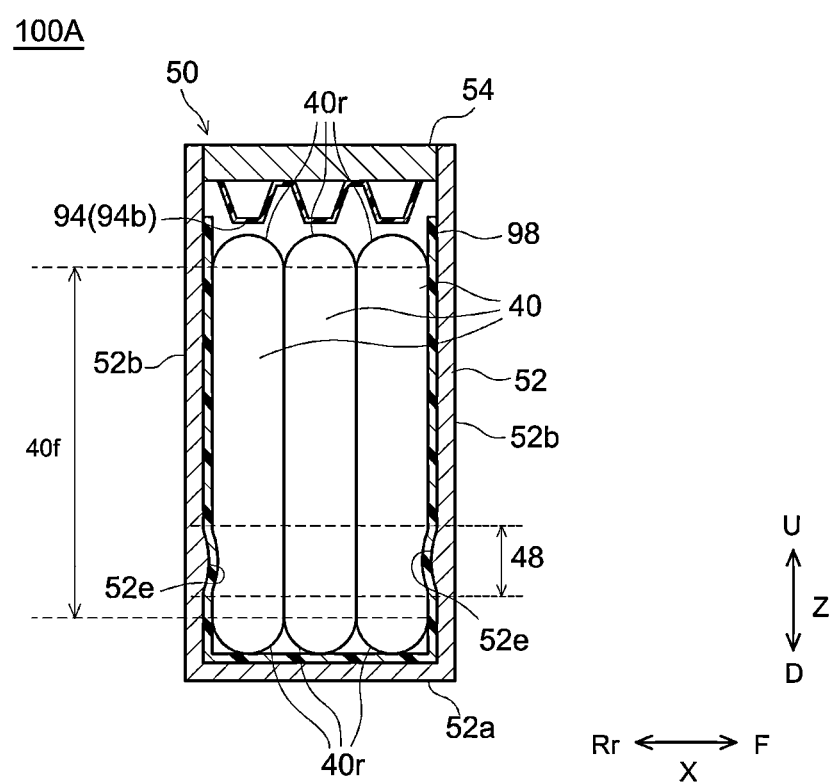
FIG. 11 is a schematic vertical cross-sectional view of a secondary battery according to a second embodiment.

As described above, in the secondary battery 100 according to the first embodiment, the protruding portions 52e are formed by performing press working to press the insufficiently stacked region 48 from the outside of the battery case 50, and thus the recessed portions 52d corresponding to the protruding portions 52e are formed on the outer surfaces of the battery case 50 (exterior body 52) (see FIGS. 1 and 3). However, the protruding portions 52e may protrude toward at least a part of the insufficiently stacked region 48, and the means for forming the protruding portions 52e is not particularly limited. For example, in a secondary battery 100A according to a second embodiment shown in FIG. 11, the protruding portions 52e are attached to the inner surfaces of the long side walls 52b of the exterior body 52. In the secondary battery 100A having such a configuration, the recessed portions as shown in FIG. 3 are not formed on the outer surfaces of the battery case 50 (the long side walls 52b of the exterior body 52). In addition, also in the secondary battery 100A according to the second embodiment, it is possible to prevent the pressing failure in the insufficiently stacked region 48 and appropriately inhibit the precipitation of the metal Li.

(2) Third Embodiment

Figure 12:
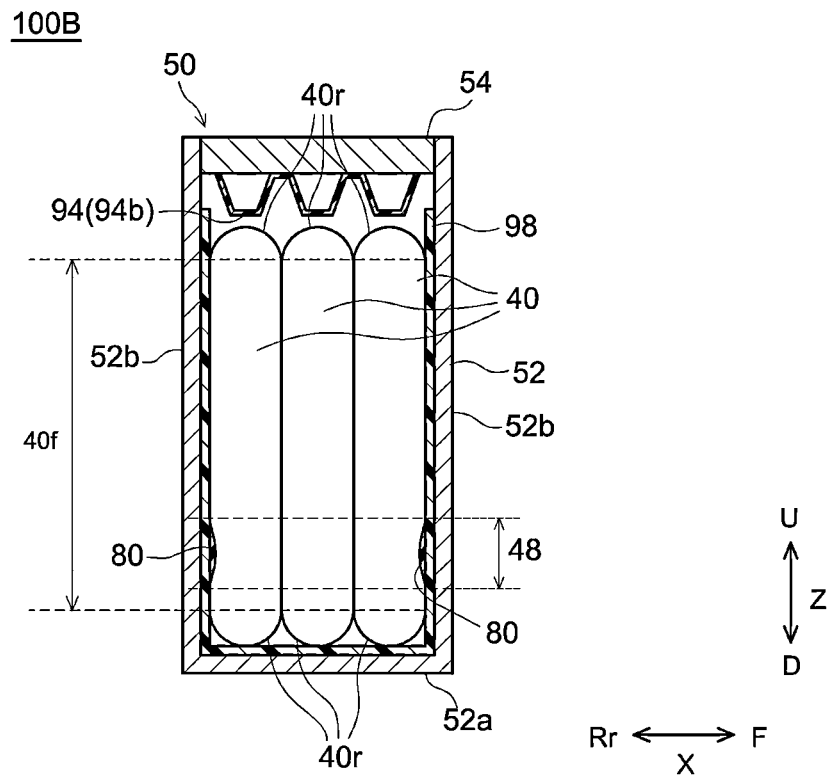
FIG. 12 is a schematic vertical cross-sectional view of a secondary battery according to a third embodiment.

Further, in the first and second embodiments described above, the configuration in which the protruding portions 52e provided on the battery case 50 press the insufficiently stacked region 48 is adopted. However, the secondary battery disclosed herein may have a configuration in which the insufficiently stacked region of the wound electrode body can be appropriately pressed, and a configuration other than the protruding portions can also be adopted. Specifically, in a secondary battery 100B according to a third embodiment shown in FIG. 12, spacers 80 are disposed between the insufficiently stacked region 48 of the wound electrode body 40 and the battery case 50 (the long side walls 52b of the exterior body 52). In the secondary battery 100B according to the third embodiment, when the long side walls 52b of the exterior body 52 are pressed to be sandwiched, the spacers 80 locally press the insufficiently stacked region 48. As a result, it is possible to prevent the pressing failure in the insufficiently stacked region 48 and appropriately inhibit the precipitation of metal Li.

Figure 13:
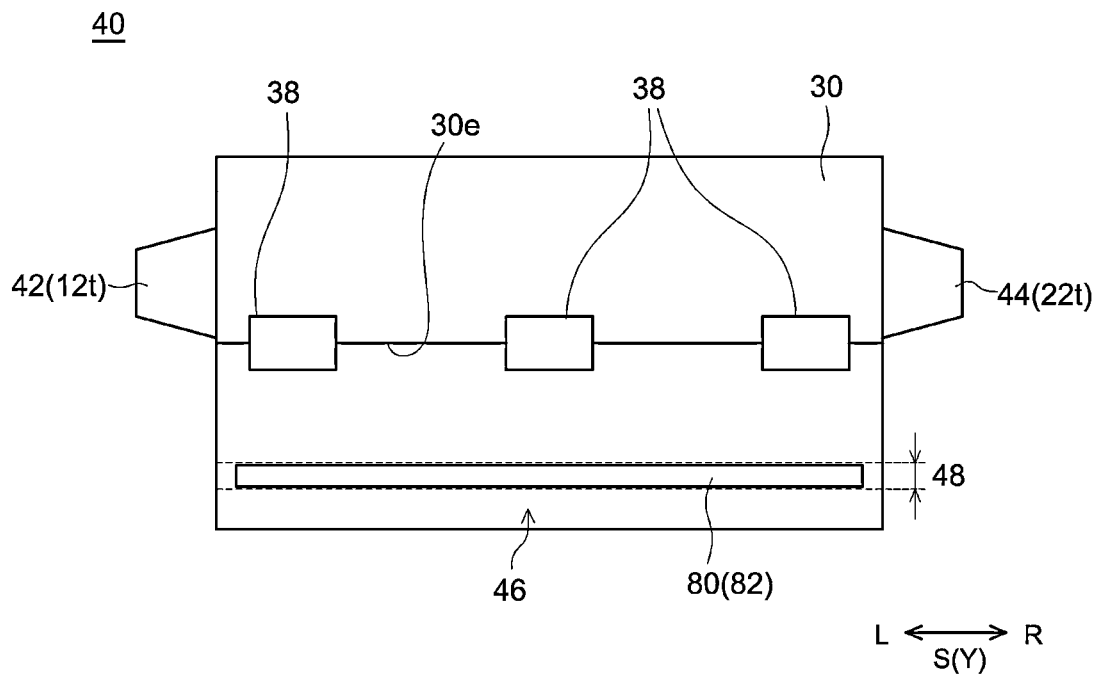
FIG. 13 is a front view schematically showing a wound electrode body of the secondary battery according to the third embodiment.

Further, a material of the spacer 80 is not particularly limited, and a material having a predetermined rigidity can be used without particular limitation. Also, in consideration of possibility of an internal short circuit, the spacer 80 is preferably made of an insulating resin material. As a preferable example of the material of the spacer 80, a hard resin such as polypropylene and polyethylene can be exemplified. In addition, as shown in FIG. 13, the spacer 80 is preferably a resin adhesive tape 82 attached to the outer surface of the flat portion 40f of the wound electrode body 40. By using such an adhesive tape 82 as the spacer 80, it is possible to reliably prevent the spacer 80 from being positionally displaced and more reliably prevent the pressing failure of the insufficiently stacked region 48. Further, similarly to the above-mentioned protruding portion 52e (see FIG. 3), dimensions (a height dimension, a thickness, and a width dimension) of the spacer 80 are preferably appropriately adjusted from the viewpoint of appropriately pressing the insufficiently stacked region 48. Also, since specific dimensions of the spacer 80 overlap the specific dimensions of the protruding portion 52e described above, detailed description thereof will be omitted.

Further, the spacer may be formed in an electrode body holder (see reference sign 98 in FIG. 12) for housing the wound electrode body. The electrode body holder of this type is usually made by folding an insulating resin sheet. In this case, by folding the resin sheet such that a plurality of resin sheets are stacked at a position facing the insufficiently stacked region, the spacer for pressing the insufficiently stacked region can be easily formed. In addition, in the configuration shown in FIG. 12, the spacer 80 is disposed between the electrode body holder 98 and the wound electrode body 40, but the spacer may be disposed between the battery case (exterior body) and the electrode body holder. Even in such a form, the insufficiently stacked region can be appropriately pressed via the electrode body holder, and thus the precipitation of metal Li can be appropriately inhibited.

(4) Fourth Embodiment

Figure 14:
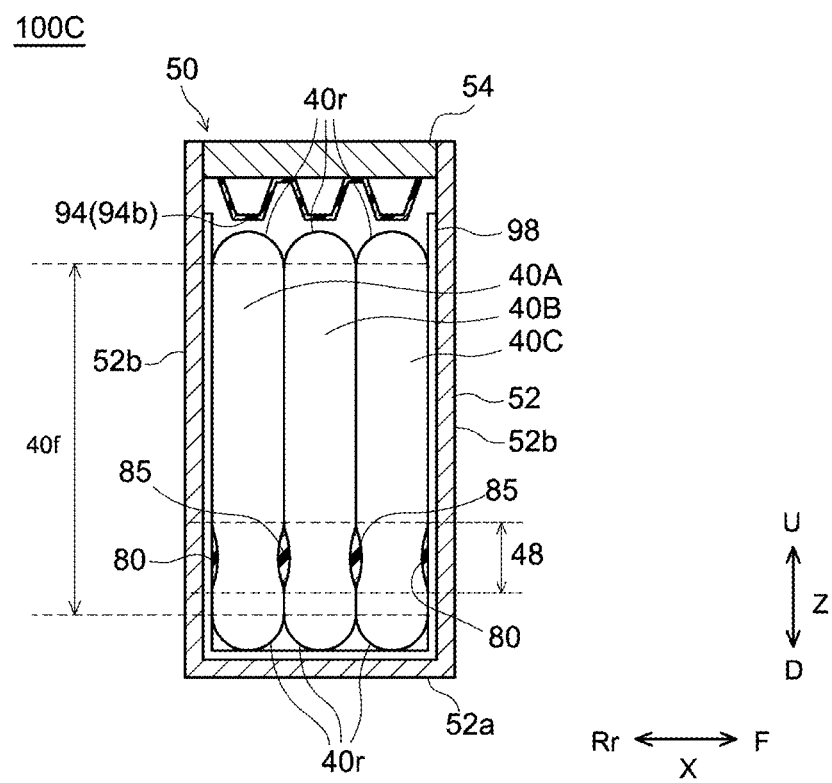
FIG. 14 is a schematic vertical cross-sectional view of a secondary battery according to a fourth embodiment.

In the first to third embodiments described above, the protruding portions 52e or the spacers 80 are provided on both outer sides in the depth direction X, and press the insufficiently stacked regions 48 of the plurality of wound electrode bodies 40 to sandwich them from both outer sides in the depth direction X. Even in such a form, an appropriate pressure can be applied to each of the insufficiently stacked regions 48 of the plurality of wound electrode bodies 40 to sufficiently inhibit the precipitation of metal Li. However, from the viewpoint of directly pressing the insufficiently stacked region of the wound electrode body disposed at a center in the depth direction to further improve the Li precipitation resistance, an intermediate spacer is preferably disposed between the insufficiently stacked regions of the two wound electrode bodies disposed adjacent to each other. Specifically, in a secondary battery 100C according to a fourth embodiment shown in FIG. 14, three wound electrode bodies 40A to 40C are housed in the battery case 50. An intermediate spacer 85 is disposed between the wound electrode bodies 40A and 40B, and an intermediate spacer 85 is disposed between the wound electrode bodies 40B and 40C. Thus, the insufficiently stacked regions 48 of the plurality of wound electrode bodies 40A to 40B can be directly pressed, and thus the precipitation of the metal Li can be more preferably inhibited. In addition, for the intermediate spacer 85, a material having a predetermined rigidity (for example, a hard resin) can be used without particular limitation, similarly to the spacer 80 described above. Further, since a specific dimension of the intermediate spacer 85 overlaps specific dimensions of the protruding portion 52e and the spacer 80 described above, detailed description thereof will be omitted.

(5) About Other Configurations

The secondary battery disclosed herein can be appropriately modified in various configurations other than the above-mentioned protruding portion and the spacer. For example, the technique disclosed herein can be particularly appropriately used in high capacity secondary batteries. Specifically, in order to construct a high-capacity secondary battery, it is required to increase a filling density of the positive electrode active material layer and increase positive electrode capacity. In this case, since a ratio of capacity of the negative electrode to capacity of the positive electrode (an opposite capacity ratio: negative electrode capacity/ positive electrode capacity) decreases, the metal Li tends to precipitate on a surface of the negative electrode active material layer. On the other hand, according to the technique disclosed herein, since the Li precipitation resistance can be improved, it is possible to realize a high density of the positive electrode active material layer, which was difficult in the past, and contribute to construction of a high-capacity secondary battery. For example, according to the technique disclosed herein, even in a case in which a wound electrode body having a filling density of 3.4 g/cc or more (for example, 3.6 g/cc) and an opposite capacity ratio of 1.1 or less (for example, 1.08) of the positive electrode active material layer is used, the precipitation of metal Li can be appropriately inhibited.

In addition, in a case in which a high-capacity secondary battery is constructed, a size of the wound electrode body is also increased. In a large wound electrode body 40 of this type, it is difficult to apply a uniform surface pressure to the entire flat portion 40f having an increased area, and thus the precipitation of metal Li is likely to occur. However, according to the technique disclosed herein, even in a case in which the large wound electrode body 40 of this type is used, it is possible to prevent the pressing failure in the insufficiently stacked region 48, and thus the precipitation of metal Li can be inhibited. As an example, a width dimension of the large wound electrode body 40 is preferably 200 mm to 400 mm, more preferably 250 mm to 350 mm, further preferably 260 mm to 320 mm, and is about 300 mm, for example. Also, a height dimension thereof is preferably 60 mm to 120 mm, more preferably 70 mm to 110 mm, particularly preferably 80 mm to 100 mm, and is about 85 mm, for example. Further, a thickness thereof is preferably 5 mm to 25 mm, more preferably 8 mm to 20 mm, and particularly preferably 10 mm to 15 mm. In addition, the "width dimension of the wound electrode body" indicates a length of a coated region of the positive electrode active material layer in the direction in which the winding axis WL extends (that is, the width direction Y). Further, the "height dimension of the wound electrode body" indicates a dimension in a direction (that is, the height direction Z) that is perpendicular to the winding axis and perpendicular to the thickness direction (depth direction X).

Test Examples

Test examples relating to the technique disclosed herein will be described below. Also, the contents of the test examples described below are not intended to limit the technique disclosed herein.

1. Production of Each Sample (1) Sample 1

In the present test, a stacked body in which a positive electrode plate and a negative electrode plate were stacked with two separators interposed therebetween was prepared, and the stacked body was wound and then press-molded, thereby producing flat-shaped wound electrode body. First, a positive electrode plate was prepared in which a positive electrode active material layer (having a thickness of 60 μm and a width of 280 mm) was applied to both surfaces of a positive electrode core body (aluminum foil having a thickness of 13 μm). The positive electrode active material layer of the positive electrode plate contains a positive electrode active material, a conductive material, and a binder in a ratio of 97.5:1.5:1.0. Also, a lithium nickel cobalt manganese composite oxide (NCM) was used for the positive electrode active material. Further, acetylene black (AB) was used for the conductive material. In addition, polyvinylidene fluoride (PVdF) was used for the binder. On the other hand, for the negative electrode plate, a negative electrode core body (copper foil having a thickness of 8 μm) to which a negative electrode active material layer (having a thickness of 80 μm and a width of 285 mm) was provided on both surfaces thereof was used. The negative electrode active material layer of the negative electrode plate contains a negative electrode active material, a thickener, and a binder in a ratio of 98.3:0.7:1.0. Further, graphite was used for the negative electrode active material, carboxymethyl cellulose (CMC) was used for the thickener, and styrene butadiene rubber (SBR) was used for the binder. In addition, for the separator, a resin sheet made of polyethylene (PE) was used.

Next, the stacked body in which the positive electrode plate and the negative electrode plate were stacked with the separator interposed therebetween was produced, and a tubular body was produced by winding the stacked body. The number of windings in the present test was set to 33. Then, press-molding was carried out, and the tubular body after winding was crushed to produce the flat-shaped wound electrode body. Here, in the wound electrode body 40 of the present test, as shown in FIG. 9, the negative electrode starting end portion 20s was extended to the curved portion 40r side, and the insufficiently stacked region 48 was generated in the vicinity of the positive electrode starting end portion 10s. Then, after the wound electrode body 40 was connected to an electrode terminal, it was housed in the battery case. Then, after the non-aqueous electrolytic solution was injected into the battery case, the battery case was sealed to construct a lithium ion secondary battery for testing. Also, the non-aqueous electrolytic solution used in the present test was prepared by dissolving a supporting salt (LiPF$_6$) at a concentration of 1 mol/L in a non-aqueous solvent in which EC, DMC, and EMC were mixed at a volume ratio of 3:4:3.

Then, in the present test, press working was performed along a line shape from the outside of the battery case in the width direction for the insufficiently stacked region of the constructed test battery. Here, in Sample 1, a pressure for press working was set to 3 kN. However, no deformation was confirmed in the battery case after press working.

(2) Sample 2

In Sample 2, a test battery was constructed in the same procedure as in Sample 1, except that the pressure for press working was changed to 6 kN. In the battery of Sample 2, it was confirmed that recessed portions having a depth of 0.044 mm were formed on the outer surfaces of the battery case after press working. That is, it is understood that protruding portions having a protruding dimension of 0.044 mm were formed on the inner surfaces of the battery case of Sample 2.

(3) Sample 3

In Sample 3, a test battery was constructed through the same procedure as in Samples 1 and 2, except that the pressure for press working was changed to 10 kN. In the battery of Sample 3, it was confirmed that recessed portions having a depth of 0.101 mm were formed on the outer surfaces of the battery case after press working. That is, it is understood that the protruding portions having a protruding dimension of 0.101 mm were formed on the inner surfaces of the battery case of Sample 3.

2. Evaluation Test

Figure 15:
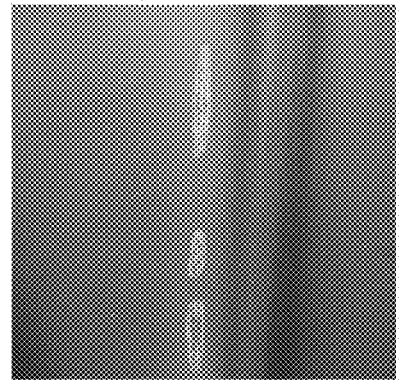
FIG. 15 is a photograph showing results of evaluating Li precipitation resistance in Sample 1.
Figure 16:
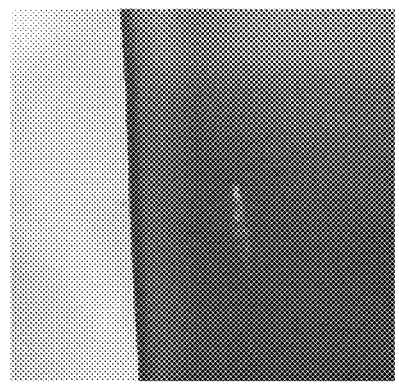
FIG. 16 is a photograph showing results of evaluating Li precipitation resistance in Sample 2.
Figure 17:
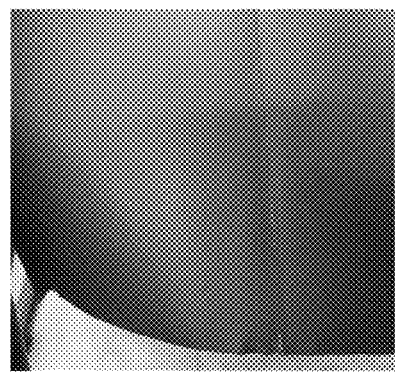
FIG. 17 is a photograph showing results of evaluating Li precipitation resistance in Sample 3.

In the present evaluation, test batteries of each sample were placed in an environment of 20° C., and a charging and discharging cycle of repeating CC charging and CC discharging under predetermined conditions was repeated for 1000 cycles. Further, in the CC charging in the present evaluation test, the battery was charged at a charging rate of 1 C for 100 seconds. On the other hand, in the CC discharging, discharging was performed at a discharging rate of 1 C for 100 seconds. Then, after the above-mentioned charging and discharging cycle was performed, SOC was discharged until it became 0%, the test battery was disassembled, and the negative electrode plate was recovered. Then, it was visually observed whether or not the metal Li was precipitated on the surface of the negative electrode active material layer. Also, the test results are shown in FIGS. 15 to 17. Further, FIG. 15 is a photograph showing results of evaluating Li precipitation resistance in Sample 1. Also, FIG. 16 is a photograph showing results of evaluating Li precipitation resistance in Sample 2. In addition, FIG. 17 is a photograph showing results of evaluating Li precipitation resistance in Sample 3.

First, as shown in FIG. 15, in Sample 1, it was confirmed that a large amount of metal Li was precipitated on the surface of the negative electrode active material layer along the insufficiently stacked region extending in the winding axis direction. On the other hand, as shown in FIGS. 16 and 17, in Samples 2 and 3, the precipitation of metal Li in the insufficiently stacked region was inhibited. From this, it was found that, by forming the protruding portion on the inner surface of the battery case and locally pressing the insufficiently stacked region with the protruding portion, the precipitation of metal Li in the vicinity of the insufficiently stacked region can be inhibited. Further, as shown in FIG. 17, in Sample 3, no precipitation of metal Li was confirmed. From this, it was found that a protruding height of the protruding portion is preferably 0.05 mm or more, and more preferably 0.1 mm or more.

The present disclosure has been described in detail above, but the above description is merely an example. That is, the technique disclosed herein includes various modifications and changes of the above-mentioned specific examples.

What is claimed is:

1. A secondary battery, comprising:
   a flat wound electrode body in which a positive electrode plate and a negative electrode plate are wound with a separator interposed therebetween; and
   a battery case that houses the flat wound electrode body, wherein
   the flat wound electrode body includes
      a pair of curved portions, each of the pair of curved portions having a curved outer surface, and
      a flat portion having a flat outer surface connecting the pair of curved portions,
   one end portion of the positive electrode plate in a longitudinal direction of the flat wound electrode body is disposed as a positive electrode starting end portion on an inner side of the flat wound electrode body, and the other end portion of the positive electrode plate is disposed as a positive electrode terminating end portion on an outer side of the flat wound electrode body,
   one end portion of the negative electrode plate in the longitudinal direction is disposed as a negative electrode starting end portion on the inner side of the flat wound electrode body, and the other end portion of the negative electrode plate is disposed as a negative electrode terminating end portion on the outer side of the flat wound electrode body,
   the positive electrode starting end portion is disposed inside the flat portion,
   the negative electrode starting end portion extends to come closer to one of the pair of curved portions than the positive electrode starting end portion,
   an insufficiently stacked region in which a total number of layers of the positive electrode plate and the negative electrode plate in a thickness direction of the flat wound electrode body is smaller than in other regions in the flat portion is formed in a vicinity of the positive electrode starting end portion in the flat portion,
   a protruding portion protruding toward at least a part of the insufficiently stacked region is formed on an inner surface of the battery case, and
   the protruding portion extends along a winding axis of the flat wound electrode body.

2. The secondary battery according to claim 1, wherein the insufficiently stacked region is formed at the flat portion and between the positive electrode starting end portion and the negative electrode starting end portion.

3. The secondary battery according to claim 1, wherein a length of the insufficiently stacked region along the flat portion is 5 mm or less.

4. The secondary battery according to claim 3, wherein a dimension of the protruding portion along the flat portion is 5 mm or less.

5. The secondary battery according to claim 1, wherein a protruding dimension of the protruding portion from the inner surface of the battery case is 0.04 mm or more.

6. The secondary battery according to claim 1, comprising:
   a plurality of flat wound electrode bodies, including the flat wound electrode body, and housed in the battery case.

7. The secondary battery according to claim 6, wherein an intermediate spacer is disposed between the insufficiently stacked regions of two flat wound electrode bodies disposed adjacent to each other among the plurality of flat wound electrode bodies.

8. The secondary battery according to claim 1, further comprising:
   a recessed portion corresponding to the protruding portion and formed on an outer surface of the battery case.

9. The secondary battery according to claim 1, wherein the protruding portion is integral with the battery case.

10. The secondary battery according to claim 1, wherein the protruding portion extends along the insufficiently stacked region of the flat wound electrode body.

* * * * *